US009822837B2

United States Patent
Groves et al.

(10) Patent No.: US 9,822,837 B2
(45) Date of Patent: Nov. 21, 2017

(54) SECONDARY DAMPENING ASSEMBLY FOR SHOCK ABSORBER

(71) Applicant: Tenneco Automotive Operating Company Inc., Lake Forest, IL (US)

(72) Inventors: Gary W. Groves, Toledo, OH (US); William Thomas Benson, Toledo, OH (US)

(73) Assignee: TENNECO AUTOMOTIVE OPERATING COMPANY INC., Lake Forest, IL (US)

( * ) Notice: Subject to any disclaimer, the term of this patent is extended or adjusted under 35 U.S.C. 154(b) by 0 days.

(21) Appl. No.: 15/017,056

(22) Filed: Feb. 5, 2016

(65) Prior Publication Data

US 2016/0230835 A1 Aug. 11, 2016

Related U.S. Application Data

(60) Provisional application No. 62/113,027, filed on Feb. 6, 2015.

(51) Int. Cl.
*F16F 9/48* (2006.01)
*B60G 13/08* (2006.01)
(Continued)

(52) U.S. Cl.
CPC .................. *F16F 9/48* (2013.01); *B60G 3/06* (2013.01); *B60G 13/08* (2013.01); *B60G 15/068* (2013.01);
(Continued)

(58) Field of Classification Search
CPC ...... F16F 9/48; F16F 9/49; F16F 9/165; F16F 9/3271; B60G 13/003; B60G 13/08
(Continued)

(56) References Cited

U.S. PATENT DOCUMENTS

| 1,794,807 A | 3/1931 | Thompson |
| 2,519,605 A | 8/1950 | Rossman |

(Continued)

FOREIGN PATENT DOCUMENTS

| CN | 101456111 A | 6/2009 |
| CN | 202023876 U | 11/2011 |

(Continued)

OTHER PUBLICATIONS

International Search Report for Application No. PCT/US2016/016296 dated Apr. 25, 2016, 4 pages.
(Continued)

*Primary Examiner* — Christopher Schwartz
(74) *Attorney, Agent, or Firm* — Howard & Howard Attorneys PLLC

(57) ABSTRACT

A shock absorber assembly includes a pressure tube having an upper end and a lower end and defining an interior, a rod guide disposed adjacent the upper end, a first compression valve assembly adjacent the lower end, a rod operatively coupled to the pressure tube having a first end and a second end, an extender coupled to the second end of the rod, a piston assembly coupled to the extender between the rod guide and the first compression valve assembly with the piston assembly disposed within the interior and slideably coupled to the pressure tube, with the piston assembly dividing the interior into an upper and a lower working chamber, a second compression valve assembly coupled to the extender between the piston assembly and the first compression valve assembly, and a cup disposed within the lower working chamber and defining a bore shaped to receive the second compression valve assembly.

16 Claims, 26 Drawing Sheets

(51) Int. Cl.
*F16F 9/16* (2006.01)
*B60G 3/06* (2006.01)
*B60G 15/06* (2006.01)

(52) U.S. Cl.
CPC ........ *F16F 9/165* (2013.01); *B60G 2200/142* (2013.01); *B60G 2202/24* (2013.01); *B60G 2500/10* (2013.01)

(58) Field of Classification Search
USPC ........... 188/278, 282.6, 318, 322.14, 322.19; 267/120, 124, 126, 221
See application file for complete search history.

(56) References Cited

U.S. PATENT DOCUMENTS

| | | | |
|---|---|---|---|
| 2,537,423 A | | 1/1951 | Rossman |
| 2,742,112 A | * | 4/1956 | Wessel ...................... F16F 9/49 137/512 |
| 2,783,859 A | | 3/1957 | Patriquin |
| 2,907,414 A | † | 10/1959 | Patriquin |
| 2,984,321 A | | 5/1961 | Schultze |
| 3,109,520 A | † | 11/1963 | Vossieck |
| 3,150,747 A | | 9/1964 | Bliven et al. |
| 3,175,645 A | * | 3/1965 | Schafer ...................... F16F 9/48 188/282.6 |
| 3,344,894 A | | 10/1967 | Kopczynski |
| 3,447,644 A | | 6/1969 | Duckett |
| 3,750,856 A | | 8/1973 | Kenworthy |
| 4,010,829 A | * | 3/1977 | Naito ...................... B60G 17/08 188/278 |
| 4,026,533 A | | 5/1977 | Hennells |
| 4,045,008 A | * | 8/1977 | Bauer ...................... F16F 9/49 267/120 |
| 4,166,522 A | | 9/1979 | Bourcier de Carbon |
| 4,230,309 A | † | 10/1980 | Schnitzius |
| 4,337,849 A | | 7/1982 | Siorek et al. |
| 4,971,181 A | * | 11/1990 | Zaenglein ............ F16F 9/3271 137/543.17 |
| 5,157,806 A | | 10/1992 | Wartian |
| 5,647,580 A | * | 7/1997 | Buma .................. B60G 17/044 267/64.17 |
| 5,996,978 A | | 12/1999 | Asanuma et al. |
| 6,290,035 B1 | | 9/2001 | Kazmirski et al. |
| 6,352,145 B1 | | 3/2002 | DeMolina et al. |
| 6,446,771 B1 | * | 9/2002 | Sintorn ................... F16F 9/064 188/288 |
| 6,668,986 B2 | † | 12/2003 | Moradmand |
| 7,216,861 B1 | * | 5/2007 | LaBarbera ................ F16F 9/38 188/322.19 |
| 7,320,388 B2 | | 1/2008 | de Molina |
| 7,431,135 B2 | | 10/2008 | Vanbrabant |
| 7,441,640 B2 | | 10/2008 | Russell |
| 8,074,974 B2 | * | 12/2011 | Nogami ............... B60G 17/044 188/322.14 |
| 8,511,447 B2 | | 8/2013 | Nowaczyk et al. |
| 8,550,223 B2 | * | 10/2013 | Cox .......................... F16F 9/49 188/318 |
| 8,556,281 B2 | † | 10/2013 | Lee |
| 8,590,678 B2 | | 11/2013 | Bombrys et al. |
| 8,701,846 B2 | | 4/2014 | Reybrouck et al. |
| 8,714,320 B2 | | 5/2014 | Bombrys et al. |
| 8,807,302 B2 | | 8/2014 | Nygren et al. |
| 8,955,654 B2 | | 2/2015 | Nygren et al. |
| 9,133,902 B2 | | 9/2015 | Spyche, Jr. et al. |
| 2004/0026836 A1 | * | 2/2004 | Brookes ............... B60G 13/003 267/64.23 |
| 2007/0000743 A1 | | 1/2007 | Naitou et al. |
| 2009/0101459 A1 | | 4/2009 | Sawai |
| 2009/0277734 A1 | | 11/2009 | Cox et al. |
| 2012/0061194 A1 | | 3/2012 | Yu |
| 2014/0008161 A1 | | 1/2014 | Cox |
| 2015/0330475 A1 | | 11/2015 | Slusarczyk et al. |
| 2016/0223045 A1 | | 8/2016 | Baldoni et al. |

FOREIGN PATENT DOCUMENTS

| | | |
|---|---|---|
| DE | 19829765 A1 | 2/1999 |
| DE | 102006055192 B3 | 4/2008 |
| EP | 1717478 A1 | 11/2006 |
| JP | S626403 A | 3/1987 |
| JP | H07233842 A | 9/1995 |
| WO | WO2004040164 A2 | 5/2004 |
| WO | WO2014037661 A1 | 3/2014 |
| WO | WO2014048993 A1 | 4/2014 |
| WO | WO 2016126776 A1 | 8/2016 |
| WO | WO 2016127076 A1 | 8/2016 |

OTHER PUBLICATIONS

International Search Report for Application No. PCT/US2016/016812 dated Apr. 25, 2016, 4 pages.
English language abstract and machine-assisted English translation of CN 202023876 extracted from espacenet.com database on Sep. 9, 2016, 15 pages.
English language abstract and machine-assisted English translation of CN 101456111 extracted from espacenet.com database on Sep. 9, 2016, 19 pages.
English language abstract for JPS6264603 extracted from espacenet.com database on Aug. 4, 2016, 2 pages.
English language abstract and machine-assisted English translation for JPH07233842 extracted from espacenet.com database on Aug. 8, 2016, 8 pages.
English language abstract and machine-assisted English translation for DE19829765 extracted from espacenet.com database on Aug. 8, 2016, 10 pages.
English language abstract and machine-assisted English translation for EP1717478 extracted from espacenet.com database on Aug. 8, 2016, 11 pages.
English language abstract and machine-assisted translation for DE102006055192 extracted from espacenet.com database May 14, 2017, 8 pages.
English language abstract and machine-assisted translation for WO2004040164 extracted from espacenet.com database May 14, 2017, 12 pages.
English language abstract and machine-assisted translation for WO2014037661 extracted from espacenet.com database May 4, 2017, 11 pages.

\* cited by examiner
† cited by third party

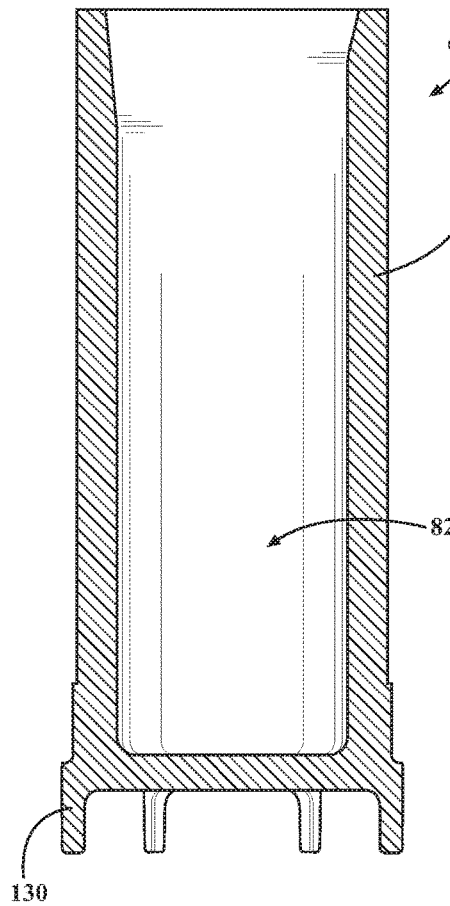
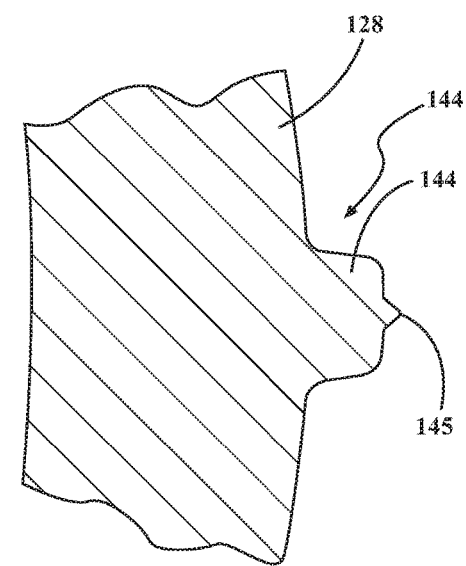
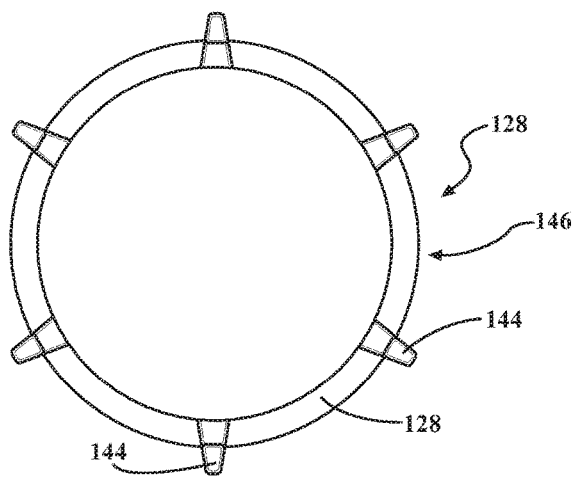

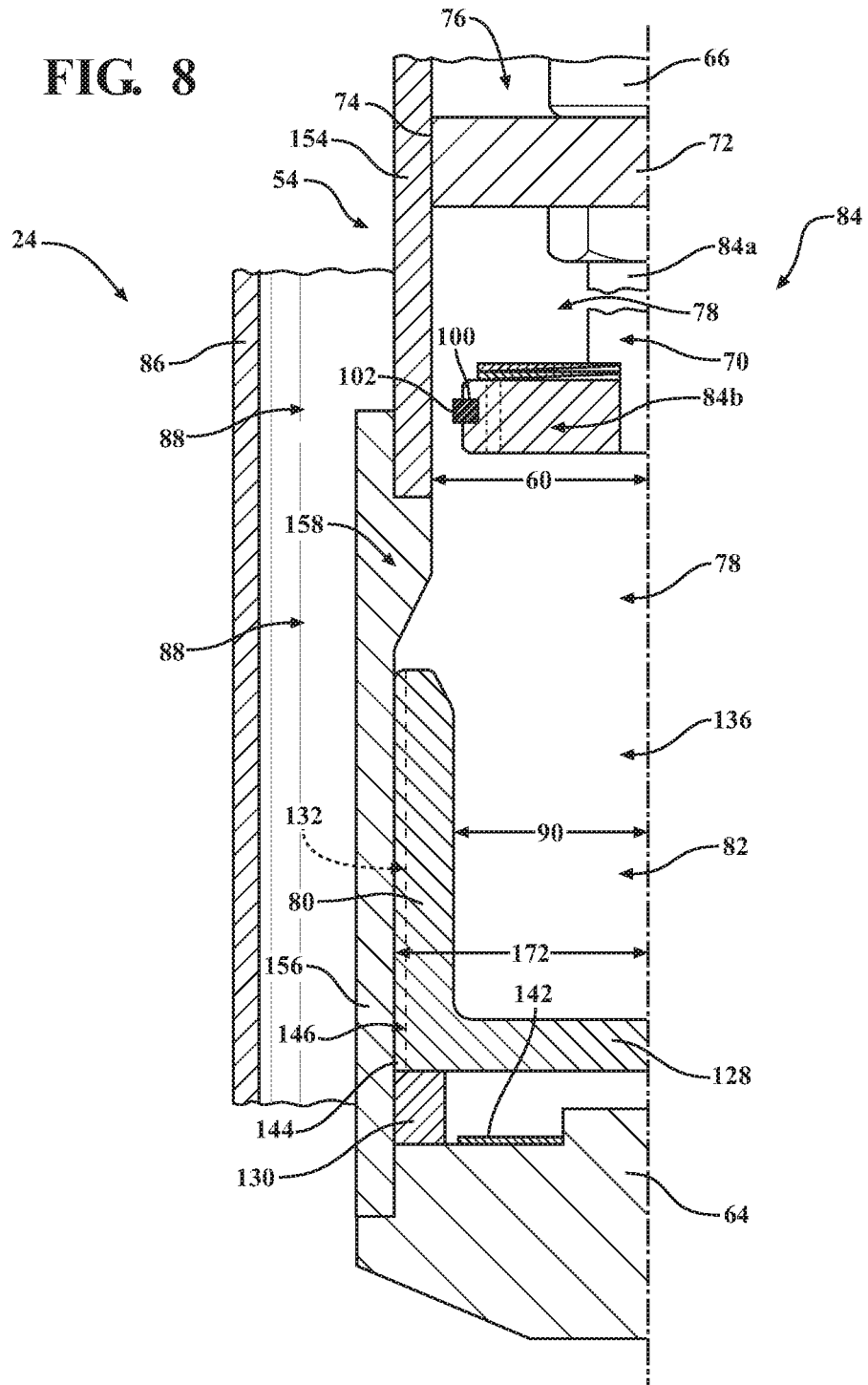

SECONDARY DAMPENING ASSEMBLY FOR SHOCK ABSORBER

CROSS-REFERENCE TO RELATED APPLICATIONS

The subject patent application claims priority to and all the benefits of U.S. Provisional Patent Application No. 62/113,027, filed on Feb. 6, 2015, which is herein incorporated by reference in its entirety.

BACKGROUND OF THE INVENTION

1. Field of the Invention

The present disclosure relates generally to shock absorbers having secondary dampening assemblies. Specifically, the present disclosure describes secondary dampening assemblies having a secondary compression valve assembly for secondary dampening.

2. Description of the Related Art

Conventional shock absorber assemblies known in the related art typically include an outer tube, a piston assembly, a rod, fluid, and one or more valves, whereby the piston assembly is connected to the rod and travels within fluid in the outer tube in operation so as to dampen axial movement of the rod with respect to the outer tube. To that end, respective opposing ends of the rod and outer tube are attached to different members or structures so as to dampen movement therebetween. By way of example, conventional automotive suspension systems utilize shock absorbers in connection with springs external to the shock absorber assembly to control the suspension dampening in compression and rebound, whereby the shock absorber assembly is typically attached to a knuckle supporting a wheel at one end, and to a portion of the vehicle's frame or body at the other end.

Depending on the application, the shock absorber assembly may also include an inner tube disposed inside the outer tube, wherein the piston assembly is instead supported in the inner tube. The shock absorber assembly is sealed at an end that receives the piston assembly. The inner tube defines a working chamber filled with fluid through which the piston assembly can move in operation. The piston assembly generally divides the working chamber into an upper working chamber and a lower working chamber. Similarly, a reservoir chamber is defined in the space between the outer tube and the inner tube. The reservoir chamber also contains fluid and is in regulated fluid communication with the working chamber via one or more valves. The chambers are sealed to prevent the leakage of fluid therefrom. The outer tube typically engages a rod guide assembly to seal the chambers.

During normal shock absorber assembly operation, the shock absorber assembly is extended and compressed during vehicle wheel and body articulation. During compression, the shock absorber assembly builds force and provides a single dampening force curve. If the shock absorber assembly is completely compressed during wheel or body articulation, a condition referred to as "bottoming out" occurs and causes an abrupt metal-to-metal noise. Further, the condition causes harsh feedback and/or vibrations that are felt by the driver.

SUMMARY OF THE INVENTION AND ADVANTAGES

A shock absorber assembly for absorbing and dissipating forces encountered when the shock absorber assembly is operated is disclosed. The shock absorber assembly includes a pressure tube having an upper end and a lower end and defining an interior, a rod guide disposed adjacent the upper end of the pressure tube, a first compression valve assembly adjacent the lower end of the pressure tube, a rod operatively coupled to the pressure tube having a first end supported by the rod guide and a second end opposite the first end with the second end disposed within the interior, an extender coupled to the second end of the rod, a piston assembly coupled to the extender between the rod guide and the first compression valve assembly with the piston assembly disposed within the interior and slideably coupled to the pressure tube, and with the piston assembly dividing the interior into an upper working chamber and a lower working chamber, a second compression valve assembly coupled to the extender between the piston assembly and the first compression valve assembly, and a cup disposed within the lower working chamber and defining a bore shaped to receive the second compression valve assembly.

The shock absorber assembly disclosed herein advantageously provides two distinct dampening force curves, a first curve when the second compression valve assembly is outside of the bore of the cup and a second curve when the second compression valve assembly is inside of the bore of the cup. As such, the shock absorber assembly disclosed herein prevents harsh feedback and/or vibrations which can be felt by a driver.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 7A is a cross-sectional view of the cup of the secondary dampening assembly of FIG. 5A;

FIG. 7C is a top view of the cup of the secondary dampening assembly of FIG. 5A;

FIG. 7D is a top cross-sectional view of a rib of the cup of FIG. 7C with the rib having a crush rib thereon;

FIG. 8 is a partial, cross-sectional view of a shock absorber assembly including a pressure tube further defined as an upper section and a lower section, an inner tube further defined as a cup, and a second compression valve assembly coupled to an extender according to another embodiment of the invention;

DETAILED DESCRIPTION OF THE INVENTION

Figure 1:
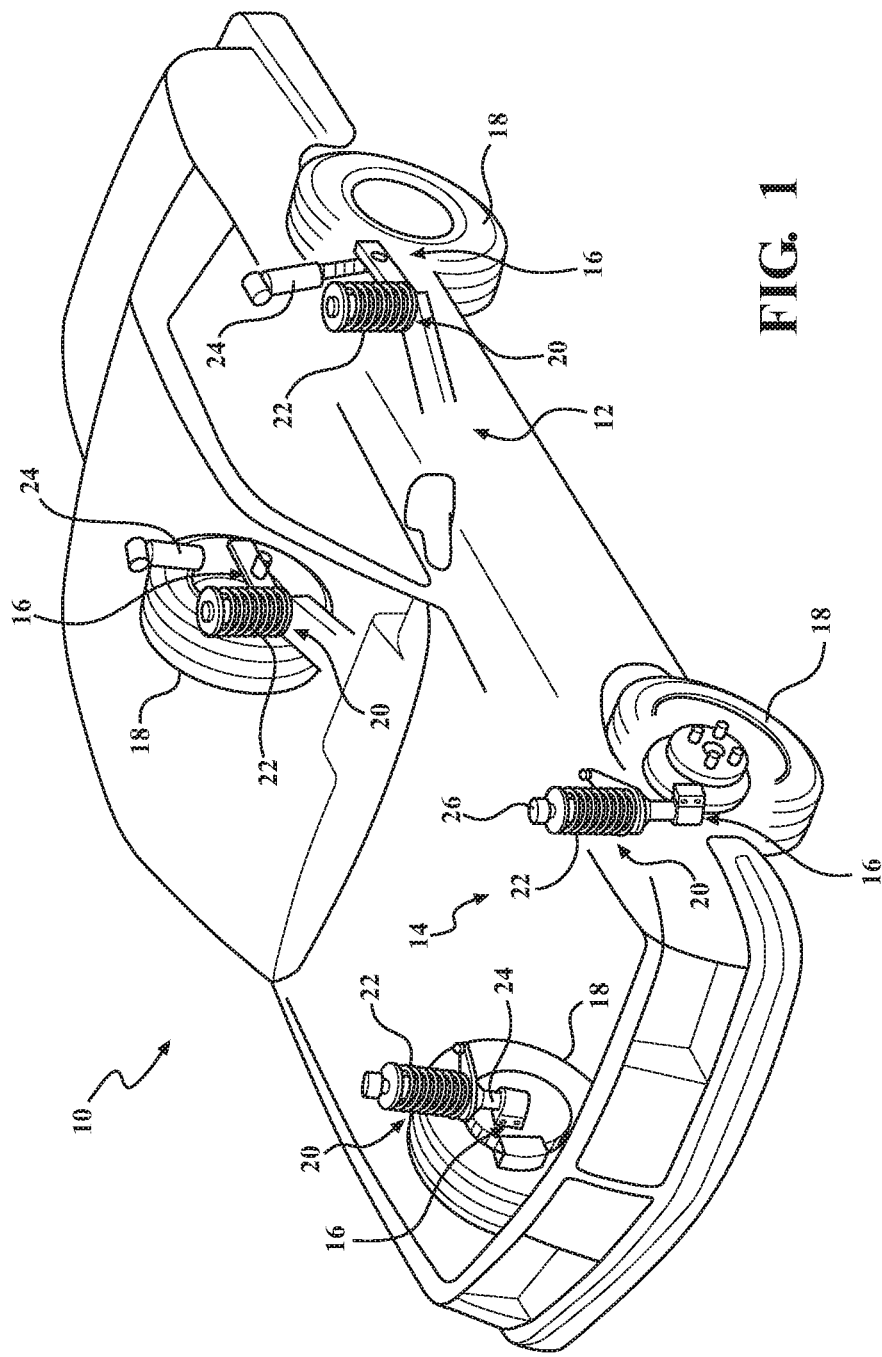
FIG. 1 is an enlarged perspective view of a generic vehicle showing a conventional suspension system.

With reference to the Figures, where like numerals are used to designate like structure throughout the several views, a portion of a conventional vehicle is illustrated at 10 in FIG. 1. The vehicle 10 includes a body 12 operatively attached to a suspension system 14 defined by four corner assemblies 16. The corner assemblies 16 are each assigned to a rotatably supported wheel 18 and are used to control the relative motion between the vehicle body 12 and wheel 18. The corner assemblies 16 each typically include a strut assembly 20 including a spring 22 to help absorb impacts and a shock absorber assembly 24 to help control motion of the spring 22 by dampening movement between the wheel 18 and vehicle body 12.

As shown in FIG. 1, the springs 22 are compression springs and can be either concentrically aligned around the shock absorber assembly 24, or spaced from the shock absorber assembly 24. Thus, those having ordinary skill in the art will appreciate that the shock absorber assembly 24 of the present invention can be used in connection with any suitable type of spring 22 without departing from the scope of the present invention. Moreover, given the number of different suspension systems 14 known in the related art, it will be appreciated that any suitable number of shock absorbers 24 could be used with any suitable number of springs 22. Further, the shock absorber assembly 24 of the present invention is not limited for use in automotive applications, and could be used in any suitable application without departing from the scope of the present invention.

Figure 2:
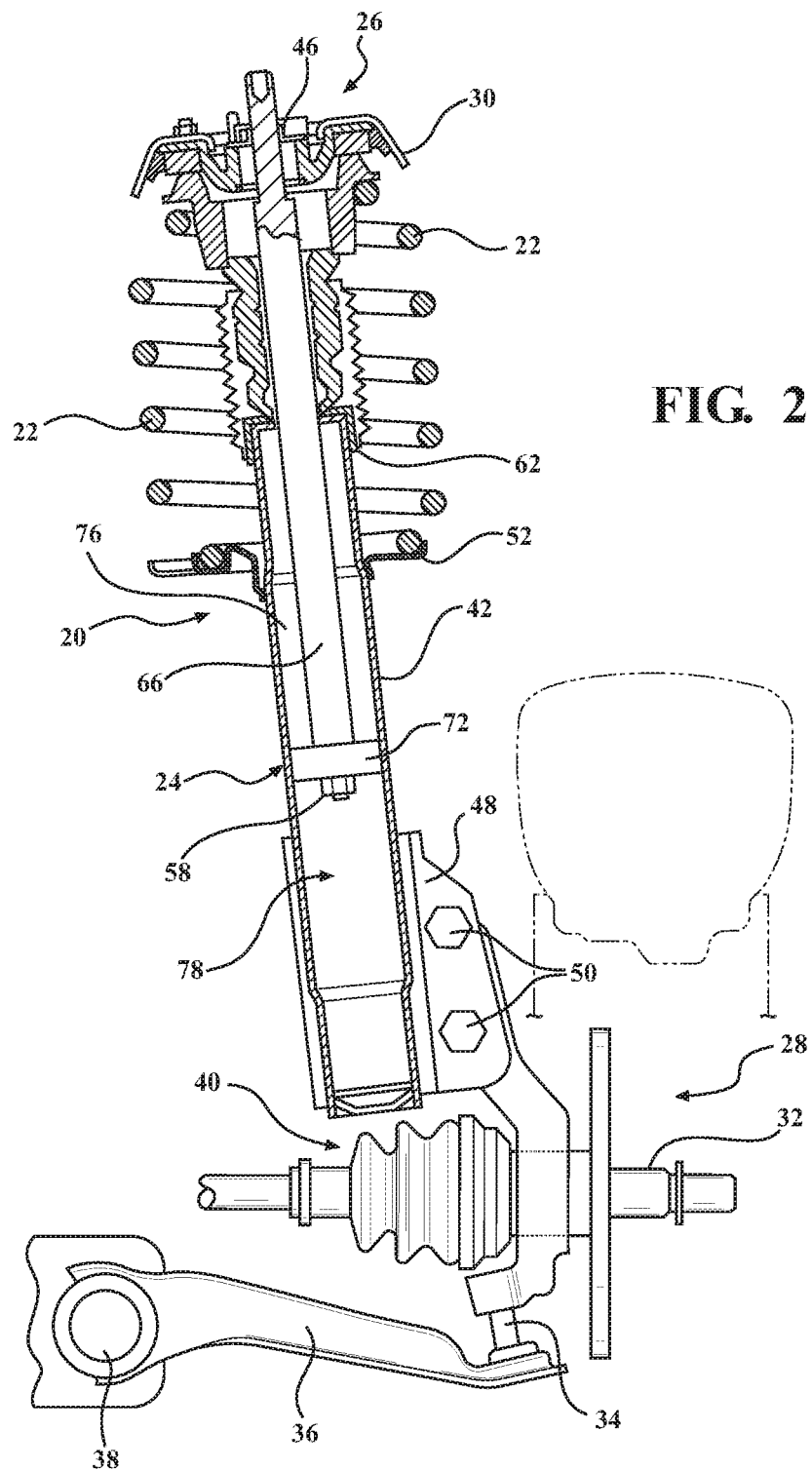
FIG. 2 is a partial sectional side view of a corner assembly of the suspension system of FIG. 1 having a conventional single-walled shock absorber assembly.

With reference now to FIG. 2, a partial sectional view of the conventional corner assembly 16 is shown for exemplary purposes. Those having ordinary skill in the art will recognize the strut assembly 20 depicted in FIG. 2 as a MacPherson strut system, which includes the shock absorber assembly 24 used to control movement between the vehicle body 12 and wheel 18 (not shown in FIG. 2). The shock absorber assembly 24 is typically mounted between a top mount assembly, generally indicated at 26, and a knuckle 28. The top mount assembly 26 mounts to the body 12 of the vehicle 10 and helps support the spring 22. An upper spring seat 30 is adjacent the top mount assembly 26 and a lower spring seat 52 receives the spring 22.

The knuckle 28 typically includes a rotatably supported hub and bearing assembly 32, to which the wheel 18 is operatively attached. The knuckle 28 is also typically connected to a ball joint 34 mounted to a lower control arm 36 which, in turn, is pivotally supported by a frame member 38 of the vehicle 10. A continuously variable joint member 40 translates rotational torque from the vehicle transmission (not shown, but generally known in the art) to the wheel 18 via the hub and bearing assembly 32. Thus, the wheel 18 can rotate in operation to drive the vehicle 10, and the suspension system 14 described above absorbs impacts and allows the wheel 18 to move with respect to the body 12.

Figure 3:
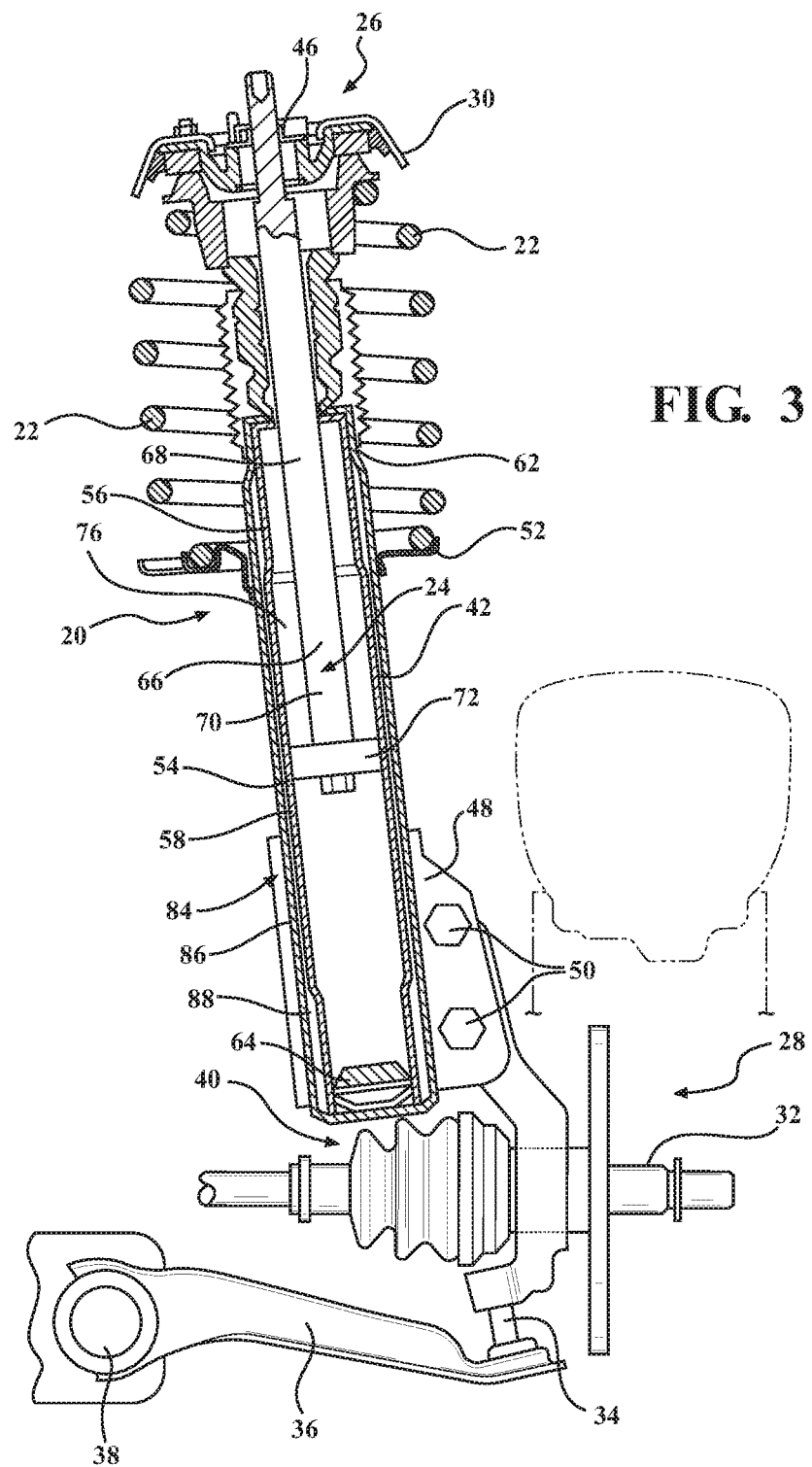
FIG. 3 is a partial sectional side view of a corner assembly of the suspension system of FIG. 1 having a conventional double-walled shock absorber assembly.

The shock absorber assembly 24 shown in FIG. 2 is a standard single-walled shock absorber and the shock absorber assembly 24 shown in FIG. 3 is a standard double-walled shock absorber. These standard shock absorbers generally include a base assembly 42 and a rod 66 concentrically aligned with and supported within the base assembly 42 as described in greater detail below. The rod 66 typically includes a stepped and/or threaded upper end 46 adapted to secure the shock absorber assembly 24 to the top mount assembly 26. The other end of the rod 66 is a threaded lower end 58. However, it will be appreciated that the shock absorber assembly 24 could be operatively attached to the top mount assembly 26, or to any suitable portion of the vehicle 10, or to any suitable member irrespective of the application, in any suitable way, without departing from the scope of the present invention.

The base assembly 42 has a mounting portion 48 adapted to attach the shock absorber assembly 24 to the knuckle 28. While the base assembly 42 depicted in FIG. 2 is attached to the knuckle 28 with two bolts 50, those having ordinary skill in the art will appreciate that the base assembly 42 of the shock absorber assembly 24 could be operatively attached to any suitable portion of the vehicle 10, or to any suitable member, in any suitable way, without departing from the scope of the present invention.

The subject disclosure discloses a secondary dampening assembly 84 which includes an extender 84a, a second compression valve assembly 84b, and a cup 128 which defines a bore 82 shaped to receive the second compression valve assembly 84. Two different embodiments of the secondary dampening assembly 84 are generally shown in FIGS. 4 and 5.

Figure 4:
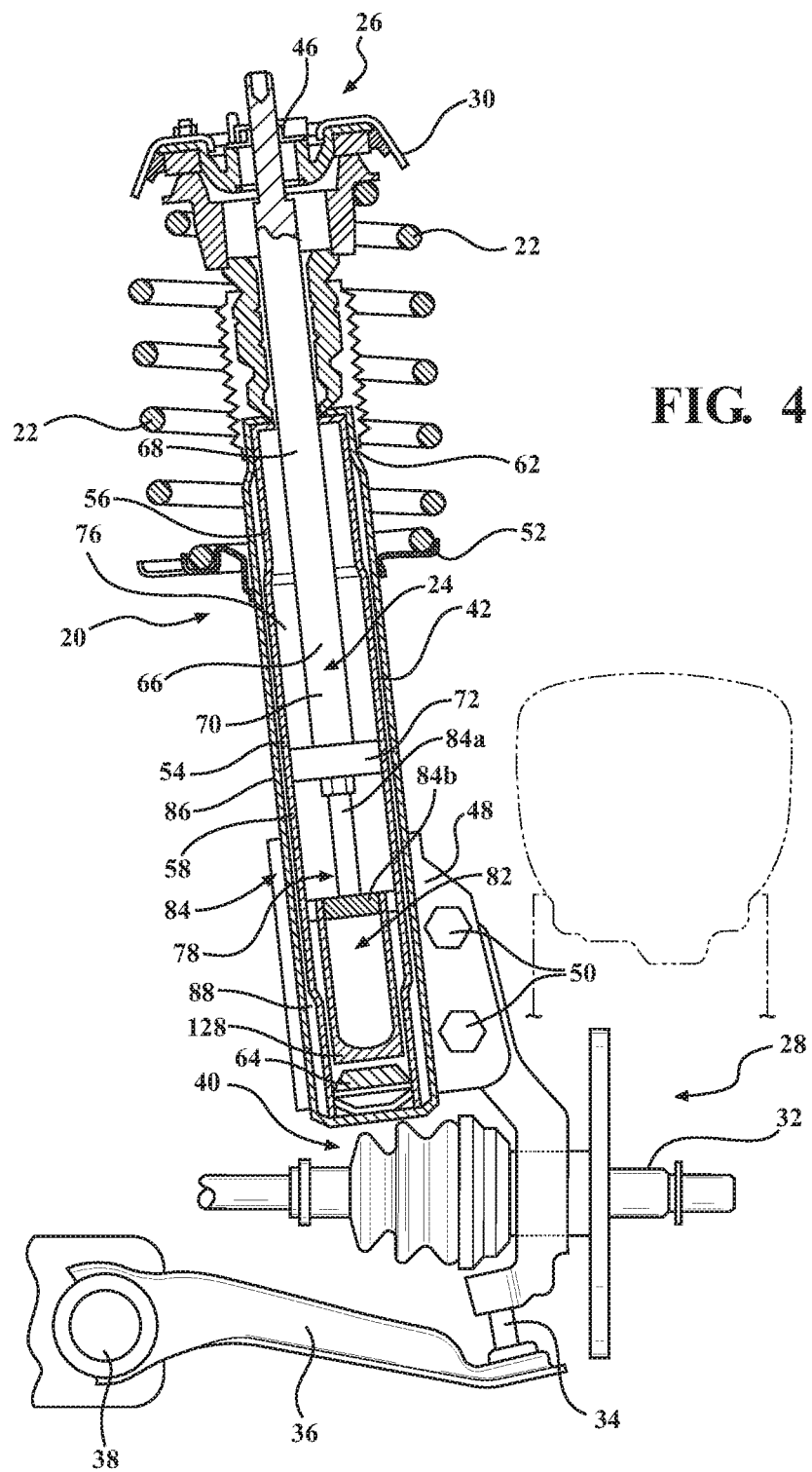
FIG. 4 is a cross-sectional view of the shock absorber assembly of FIG. 3 generally showing an embodiment of a secondary dampening assembly.

Referring now to FIG. 4, the shock absorber assembly 24 of FIG. 3 is shown generally having the secondary dampening assembly 84 of one embodiment of the subject invention disposed within a lower working chamber 78 of the shock absorber assembly 24. In the embodiment which is generally shown, the secondary dampening assembly 84 includes an extender 84a, a second compression valve assembly 84b, and a cup 128. The extender 84a is coupled to the second end 70 of the rod 66 and carries the second compression valve assembly 84b. The cup 128 is disposed within the lower working chamber 78 of the shock absorber assembly 24, defines a bore 82, and has an open end for receiving the second compression valve assembly 84b. In FIG. 4, the second compression valve assembly 84b is shown within the bore 82.

Figure 5A:
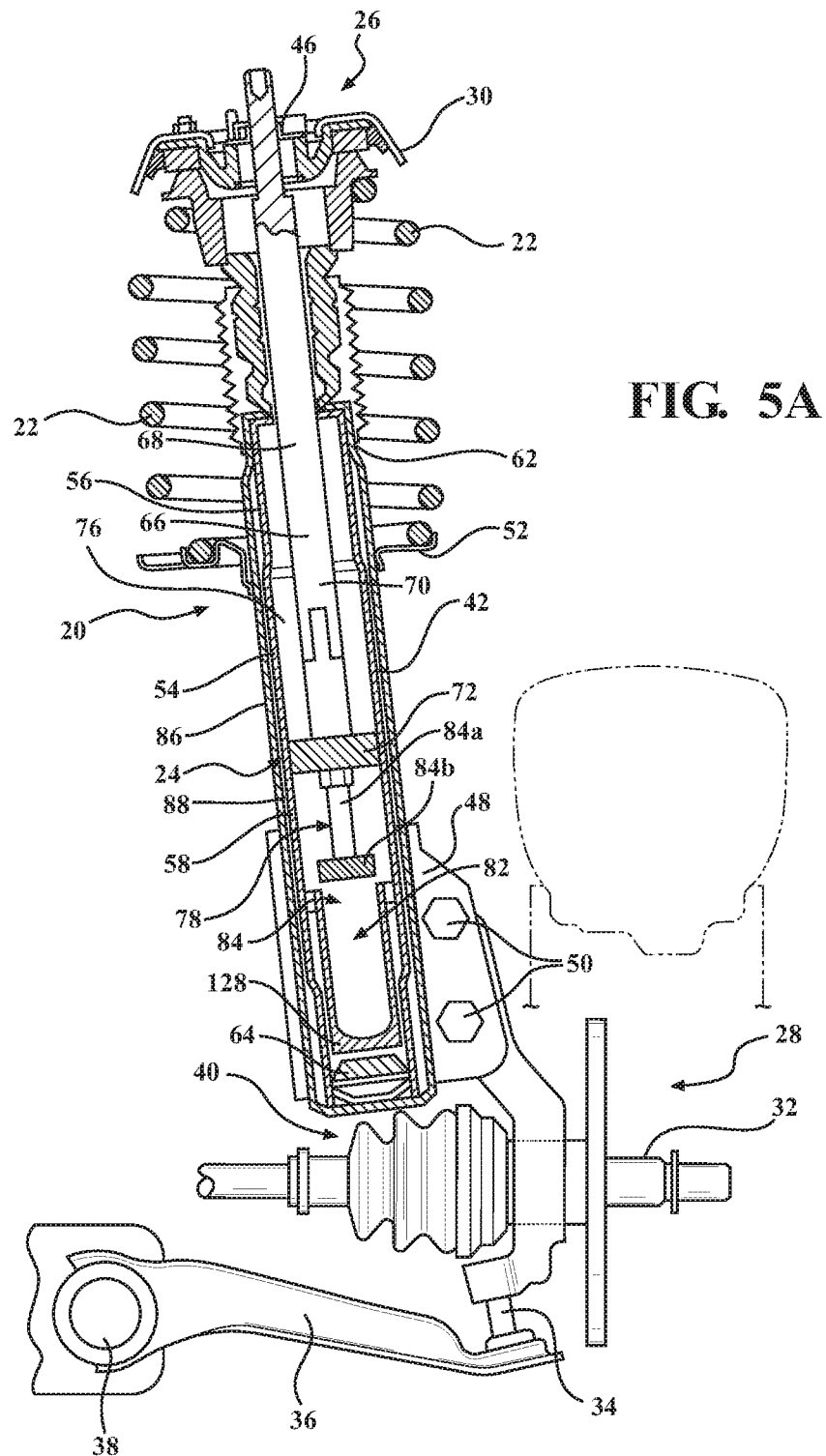
FIG. 5A is a cross-sectional view of the shock absorber assembly of FIG. 3 generally showing another embodiment of a secondary dampening assembly.

Referring now to FIG. 5A, an enlarged view of the shock absorber assembly 24 of FIG. 3 is shown generally having the secondary dampening assembly 84 of another embodiment of the subject invention disposed within the lower working chamber 78 of the shock absorber assembly 24. In the embodiment which is generally shown, the secondary dampening assembly 84 includes an extender 84a, a second compression valve assembly 84b, and a cup 128. The extender 84a is threadedly coupled to the second end 70 of the rod 66. In contrast to the embodiment of FIG. 4, the extender 84a carries the piston assembly 72 and also carries the second compression valve assembly 84b. The cup 128 is disposed within the lower working chamber 78 of the shock absorber assembly 24, defines the bore 82, and has the open end for receiving the second compression valve assembly 84b. In FIG. 5A, the second compression valve assembly 84b is shown within the bore 82.

Figure 5B:
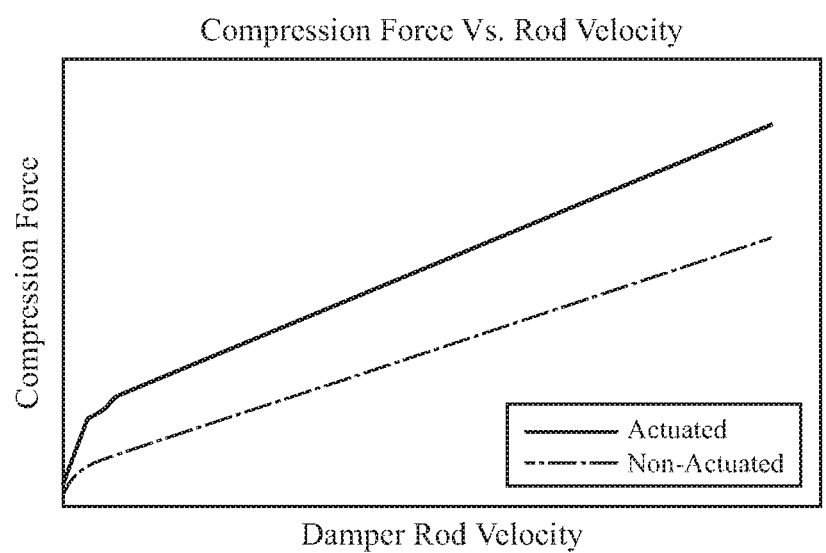
FIG. 5B is a graph of compression force versus deflection characteristics according to the embodiment shown in FIG. 5A.

Referring now to FIG. 5B, a graph of compression force versus deflection characteristics for the shock absorber 24 according to the embodiment shown in FIG. 5A is shown.

Generally, the secondary dampening assembly 84 including the second compression valve assembly 84b provides a dampening switching mechanism, as opposed to a displacement based end stop. Conventional hydraulic compression stop systems build force with distance displaced as with a spring. In contrast, the secondary dampening assembly 84 disclosed herein allows dampening force to remain velocity dependent and switch from one characteristic to another based on the position of the rod in the damper. The secondary dampening assembly 84 allows for two different compression dampening force curves to be chosen for one shock absorber, along with a position at which the change occurs. The digressive velocity dependence and lack of displacement dependence is due to the design of the secondary dampening assembly 84. In other words, the secondary dampening assembly 84 of the subject disclosure provides two distinct dampening force curves, a first curve when the second compression valve assembly 84b is outside of the bore 82 (not actuated) of the cup 128 and a second curve (actuated) when the second compression valve assembly 84b is inside of the bore 82 of the cup 128.

Figure 6:
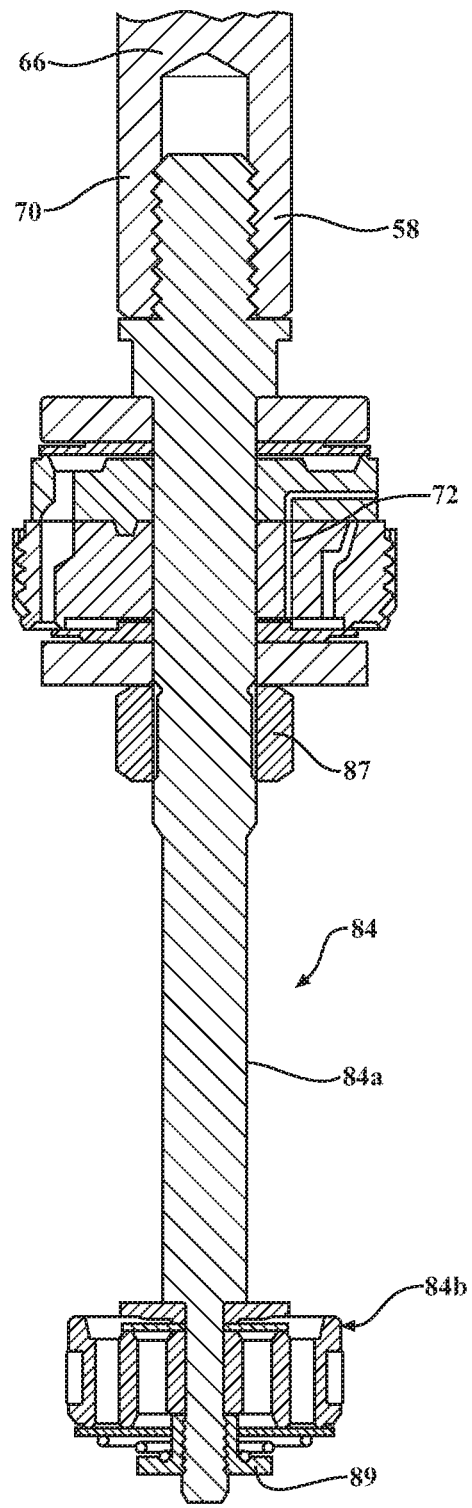
FIG. 6 is an enlarged cross-sectional view of the extender of the secondary dampening assembly of FIG. 5A.

Referring now to FIG. 6, a cross-sectional view of the secondary dampening assembly 84 of FIG. 5A is shown (with a particular focus on the configuration of the extender 84a). In FIG. 6, the extender 84a is coupled to the second end 70 of the rod 66. The piston assembly 72 and the second compression valve assembly 84b are carried by the extender 84a. The piston assembly is carried on the extender 84a with a first nut 87, and the second compression valve assembly 84b is carried on the extender 84a with a second nut 89. In the embodiment of FIG. 6, the second end 70 of the rod 66 is threadedly coupled to the extender 84a. In an alternative embodiment, the extender 84a could be coupled to the second end 70 of the rod 66 via riveting.

Figure 7B:
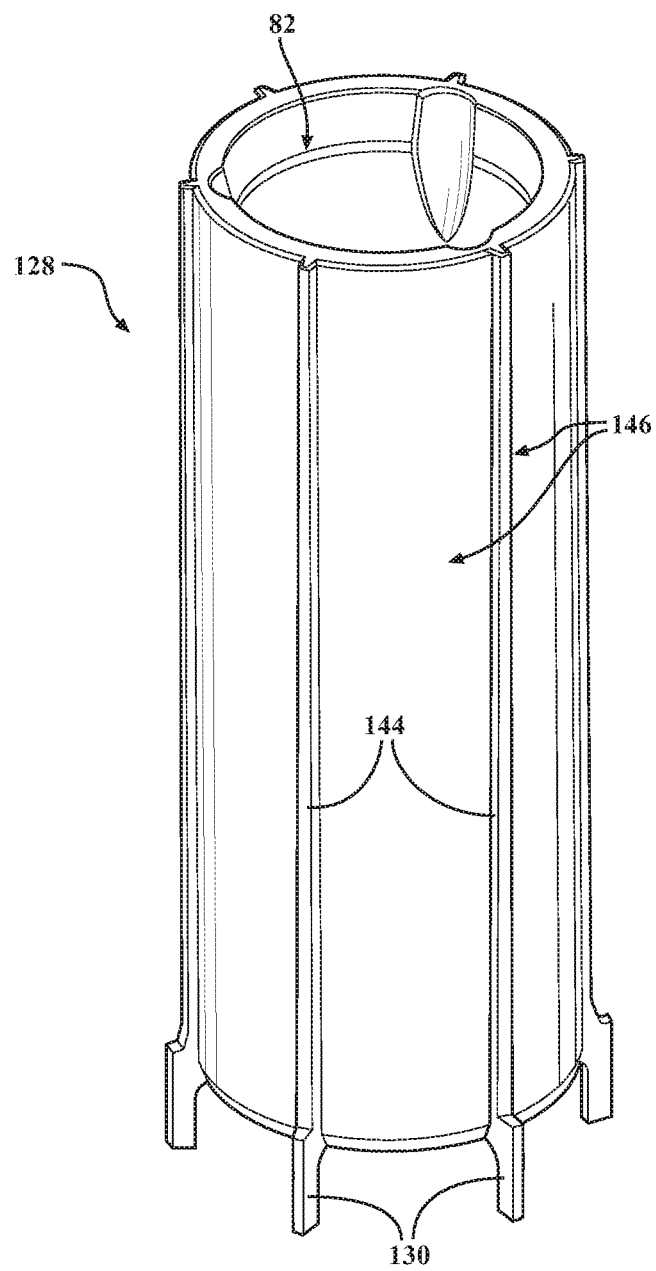
FIG. 7B is a perspective view of the cup of the secondary dampening assembly of FIG. 5A.
Figure 7E:
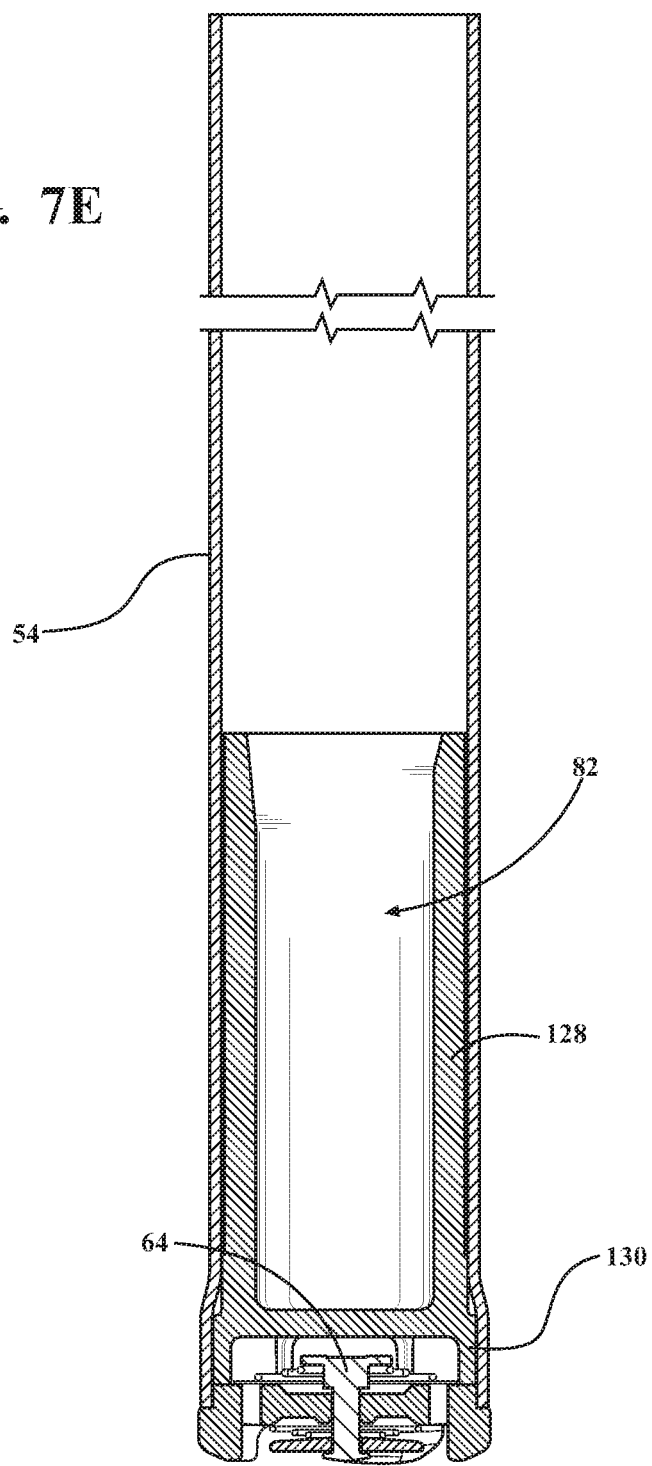
FIG. 7E is a cross-sectional view of the cup of FIGS. 7A-7D disposed within a lower working chamber of a pressure tube of the secondary dampening assembly.

Referring now to FIGS. 7A through 7E, various views of the cup 128 of the secondary dampening assembly 84 of FIG. 5A are shown. The cup 128 defines the bore 82 and has the open end for receiving the second compression valve assembly 84b. The cup 128 also has a plurality of ribs 144 defining a plurality of slots 146. Of course, the plurality of ribs 144 from one to fifteen ribs or even more than ten has been contemplated. In many embodiments, the cup 128 has from two to ten ribs 144. Six ribs 144 are shown in FIGS. 7A through 7E. In some embodiments, the rib 144 has one or more crush ribs 145 thereon for engaging the cup 128 with the pressure tube 54. FIG. 7A shows a cross-sectional view of the cup 128 of the secondary dampening assembly 84 of FIG. 5A, while FIG. 7B shows a perspective view of the cup 128 of the secondary dampening assembly 84 of FIG. 5A. The interior wall of the cup 128 can include one or more flow grooves, either tapered or non-tapered extending longitudinally towards a closed end of the cup 128. In this embodiment, three grooves are shown. FIG. 7C shows a top view of the cup 128 of the secondary dampening assembly 84 of FIG. 5A, and FIG. 7D is an enlarged top cross-sectional view of a rib 144 of the cup of FIG. 7C with the rib 144 having a crush rib 145 thereon. FIG. 7E is a cross-sectional view of the cup 128 of FIGS. 7A through 7D disposed within a lower working chamber 78 of the pressure tube 54. That is, FIG. 7E shows the cup 128 is disposed within the lower working chamber 78 of the shock absorber assembly 24. In the embodiment of FIG. 7E, the pressure tube 54 flares out to engageably receive the cup 128. In such embodiments, the cup 128 can be press fit into the pressure tube 54. The ribs 144 (with or without one or more crush ribs 145) can engage the cup 128 with the pressure tube via a press fit. The plurality of ribs 144 defining a plurality of slots 146 between the cup 128 and the pressure tube 54 (e.g. a plurality of slots 146 between a portion of the inner tube 80 and the pressure tube 54). The plurality of slots 146 allows fluid to flow around the ribs during the compression stroke and the rebound stroke of the rod 66.

Many of the Figures generally show a partial, cross-section view of a shock absorber assembly 24 of the subject invention. Each embodiment of the shock absorber assembly 24 shown throughout the Figures will be described in more detail below. The shock absorber assembly 24 includes the pressure tube 54 having an upper end 56 and a lower end 58. The pressure tube 54 has a first diameter 60 defining an interior. The shock absorber assembly 24 also includes a rod guide 62 (shown in FIGS. 2, 3, and 4) disposed adjacent the upper end 56 of the pressure tube 54. The shock absorber assembly 24 further includes a first compression valve assembly 64 adjacent the lower end 58 of the pressure tube 54, and a rod 66 operatively coupled to the pressure tube 54. The pressure tube 54 is typically comprised of metal.

The rod 66 has a first end 68 supported by the rod guide 62 for concentrically aligning the rod 66 with the pressure tube 54. The rod 66 has a second end 70 opposite the first end 68 with the second end 70 disposed within the interior of the pressure tube 54. The rod 66 moves within the interior of the pressure tube 54 during a compression stroke and a rebound stroke. During the compression stroke, the second end 70 of the rod 66 moves toward the first compression valve assembly 64. During a rebound stroke, the second end 70 of the rod 66 moves away from the first compression valve assembly 64.

The shock absorber assembly 24 also includes a piston assembly 72 coupled to the rod 66 between the rod guide 62 and the first compression valve assembly 64, with the piston assembly 72 disposed within the interior and slideably coupled to the pressure tube 54, as shown in many of the Figures. The piston assembly 72 typically includes a piston assembly seal 74 for sealing the piston assembly 72 with the pressure tube 54. The piston assembly 72 divides the interior into an upper working chamber 76 and a lower working chamber 78. The volume of the upper working chamber 76 increases and the volume of the lower working chamber 78 decreases during the compression stroke of the rod 66. The volume of the upper working chamber 76 decreases and the volume of the lower working chamber 78 increases during the rebound stroke of the rod 66.

With reference to FIG. 8, the shock absorber assembly 24 additionally includes an inner tube 80 (e.g. the cup 128) disposed within the lower working chamber 78 of the pressure tube 54 at the lower end 58. The inner tube 80 at least partially defines a bore 82. Different embodiments of the inner tube 80 of different embodiments of the shock absorber assembly 24 will be described in further detail below.

The shock absorber assembly 24 includes the secondary dampening assembly 84 disposed within the interior. Different embodiments of the secondary dampening assembly 84 will be described in further detail below for the different embodiments. For example, as shown in numerous embodiments throughout FIGS. 4 through 15, the secondary dampening assembly 84 includes the second compression valve assembly 84b coupled (with an extender 84a in some embodiments) to the second end 70 of the rod 66 between the piston assembly 72 and the first compression valve assembly 64.

As another example, as shown in numerous embodiments throughout FIGS. 16 through 23, secondary dampening assembly 84 includes the second compression valve assembly 84b disposed within the lower working chamber 78. In such embodiments the second compression valve assembly 84b is suspended within the bore 82 and spaced from the first compression valve assembly 64. The shock absorber assembly 24 includes a reservoir tube 86 defining a reservoir chamber 88 at least partially accommodating the pressure tube 54.

Figure 12:
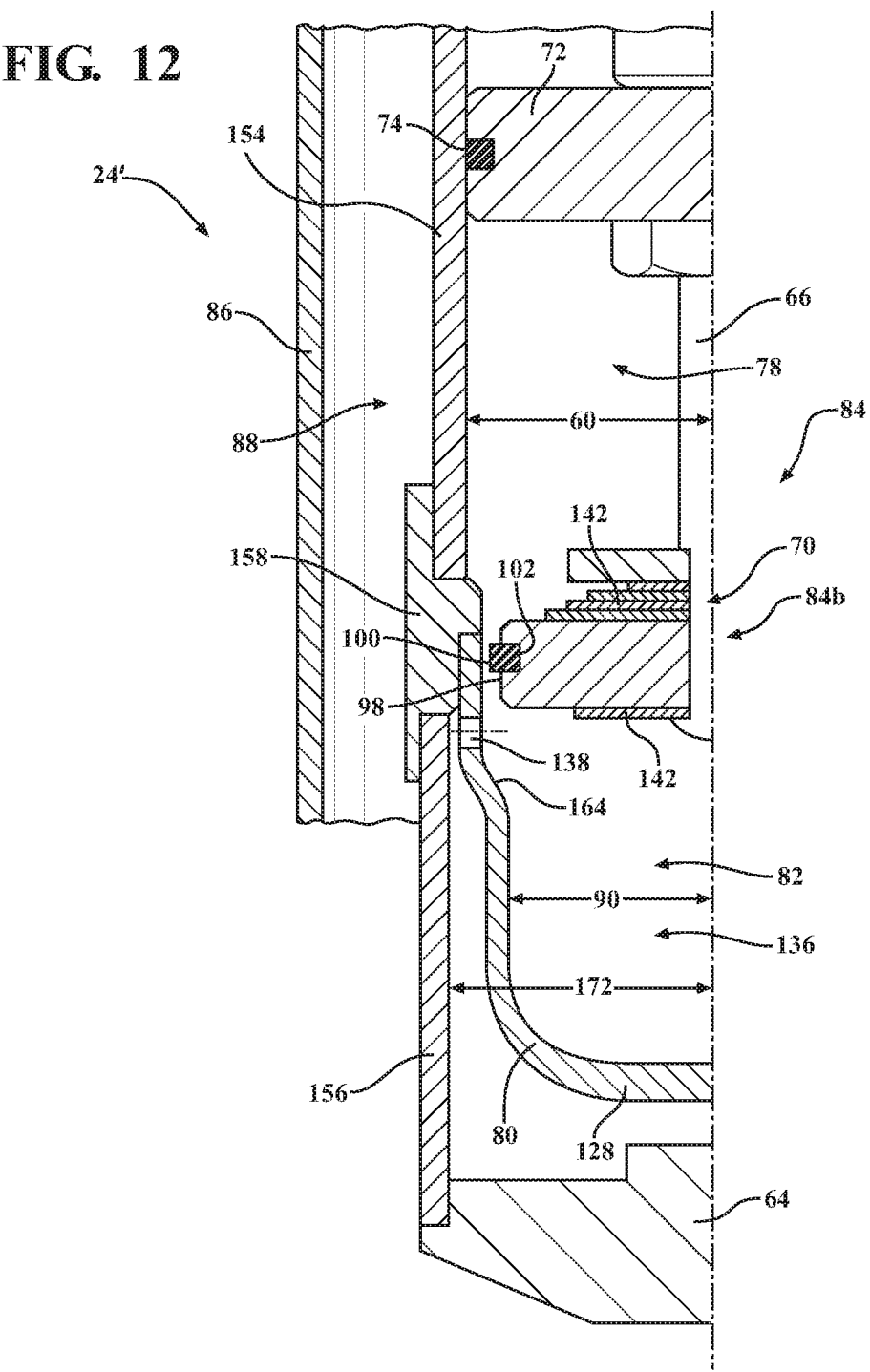
FIG. 12 is a partial, cross-sectional view of a shock absorber assembly including a pressure tube further defined as an upper section and a lower section, an adapter disposed between the upper section and the lower section, an inner tube further defined as a cup, and a second compression valve assembly coupled to a rod according to another embodiment of the invention.

The pressure tube 54 shown in FIGS. 8, 9, 12, 13, and 23 is further defined as an upper section 154 and a lower section 156. The upper section 154 has the first diameter 60 and the lower section 156 has a third diameter 172 greater than the first diameter 60, which allows the inner tube 80 to be disposed within and coupled to the lower section 156. In other words, the third diameter 172 is configured such that the inner tube 80 fits within the inner tube 80. In this embodiment, the inner tube 80 is coupled to the lower section 156 with the inner tube 80 having a second diameter 90 less than the first diameter 60. The shock absorber assembly 24 includes an adapter 158 disposed between the upper section 154 and the lower section 156 for coupling the upper section 154 to the lower section 156. It is to be appreciated that the adapter 158 may be a single, additional component, as shown in FIG. 12, or the adapter 158 may be integral with the lower section 156, as shown in FIGS. 8, 9, 13, and 23. It is also to be appreciated that the adapter 158 may be integral with the upper section 154 without departing from the scope of the present invention.

Figure 23:
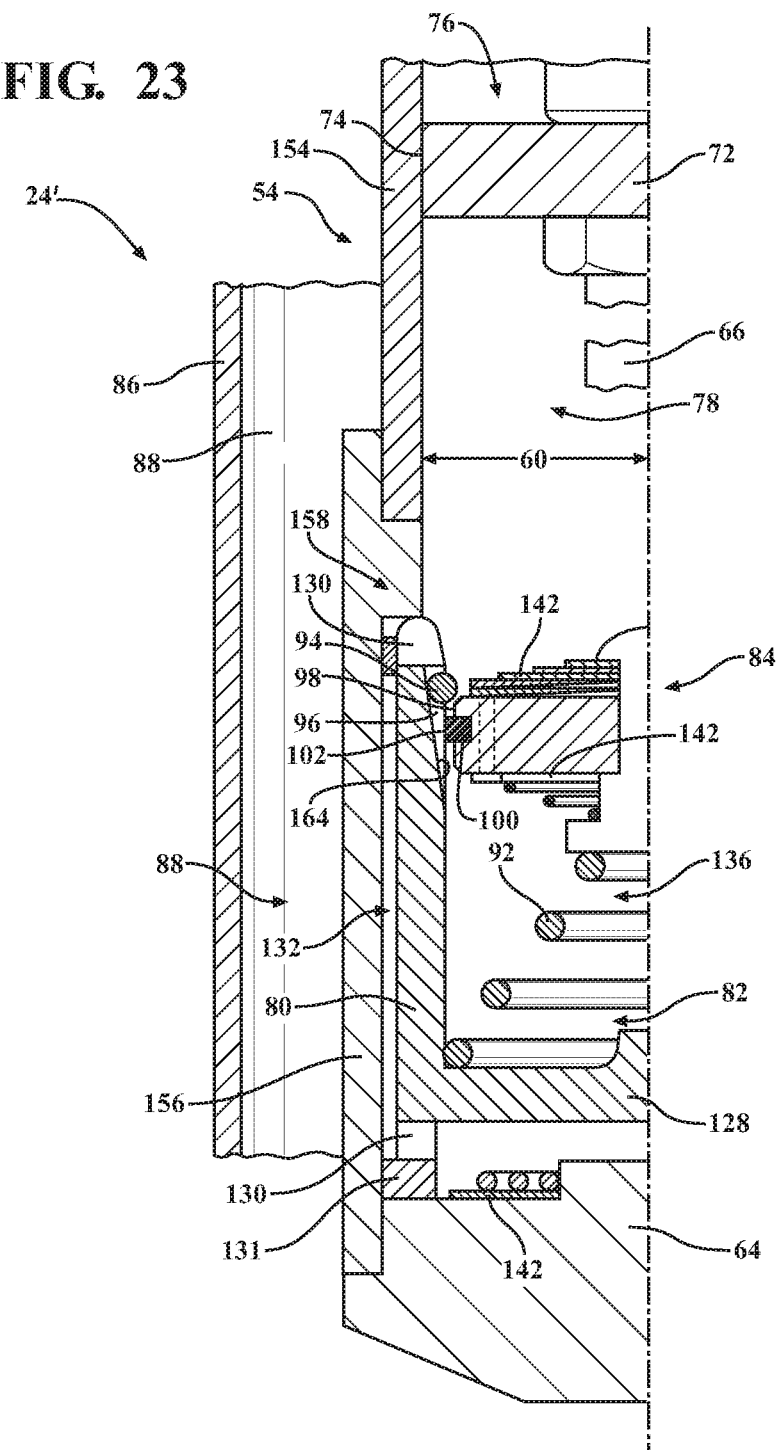
FIG. 23 is a partial, cross-sectional view of a shock absorber assembly including a pressure tube further defined as an upper section and a lower section, an inner tube further defined as a cup, and a second compression valve assembly according to another embodiment of the invention.

When the inner tube 80 comprises the upper section 154 and the lower section 156, the second compression valve assembly 84b may be coupled to the second end 70 of the rod 66 between the piston assembly 72 and the first compression valve assembly 64, as shown in FIGS. 8, 9, 12, and 13, or suspended within the bore 82 and spaced from the first compression valve assembly 64 and in slideable engagement with the lower section 156, as shown in FIG. 23. When the second compression valve assembly 84b is coupled to the second end 70 of the rod 66 between the piston assembly 72 and the first compression valve assembly 64, the piston assembly 72 is slideably engaged with the upper section 154 and the second compression valve assembly 84b is slideably engageable with the lower section 156. The first diameter 60, the second diameter 90, and the third diameter 172 values may be changed depending on the size of various components, such as, but not limited to, the first compression valve assembly 64, the second compression valve assembly 84b, and/or the piston assembly 72.

As mentioned above, FIGS. 3 through 15 show the second compression valve assembly 84b coupled to the second end 70 of the rod 66 between the piston assembly 72 and the first compression valve assembly 64. In some embodiments, the extender 84a is coupled to the second end 70 of the rod 66 and second compression valve assembly 84b and optionally the piston assembly 72 are carried by the extender 84a. Said differently, the piston assembly 72 and the second compression valve assembly 84b can be coupled to the rod 66 or coupled to the extender, which is coupled to the second end 70 of the rod 66.

The second compression valve assembly 84b is slideably engaged with the inner tube 80 when disposed within the bore 82. Said differently, since the second compression valve assembly 84b is coupled to the second end 70 of the rod 66, the second compression valve assembly 84b is not continuously disposed within the bore 82 and, therefore, selectively engages the inner tube 80 during the compression stroke and the rebound stroke of the rod 66.

Figure 13:
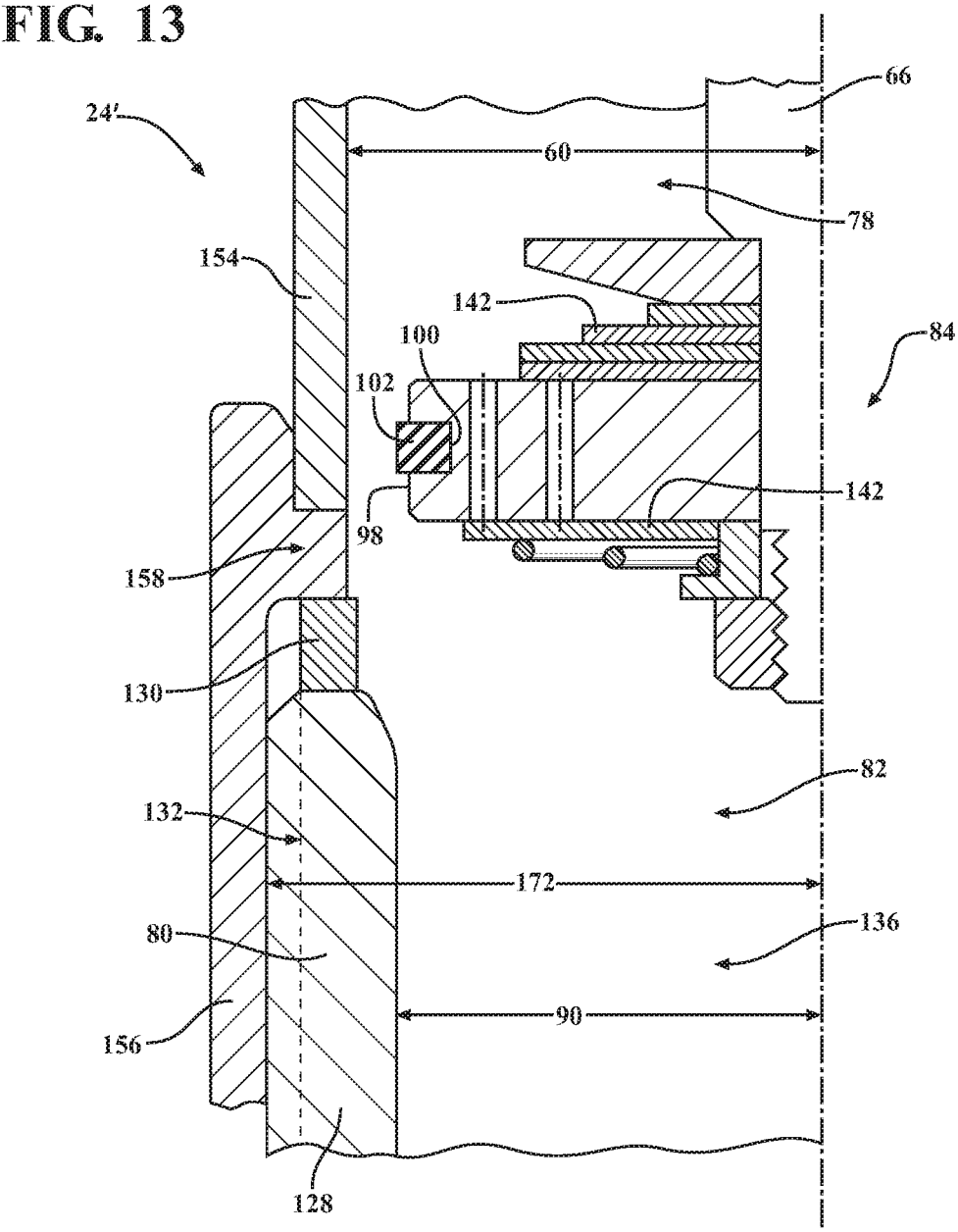
FIG. 13 is a partial, cross-sectional view of a shock absorber assembly including a pressure tube further defined as an upper section and a lower section, an inner tube further defined as a cup, a plurality of legs disposed between the inner tube and the lower section, and a second compression valve assembly coupled to a rod according to another embodiment of the invention.
Figure 14:
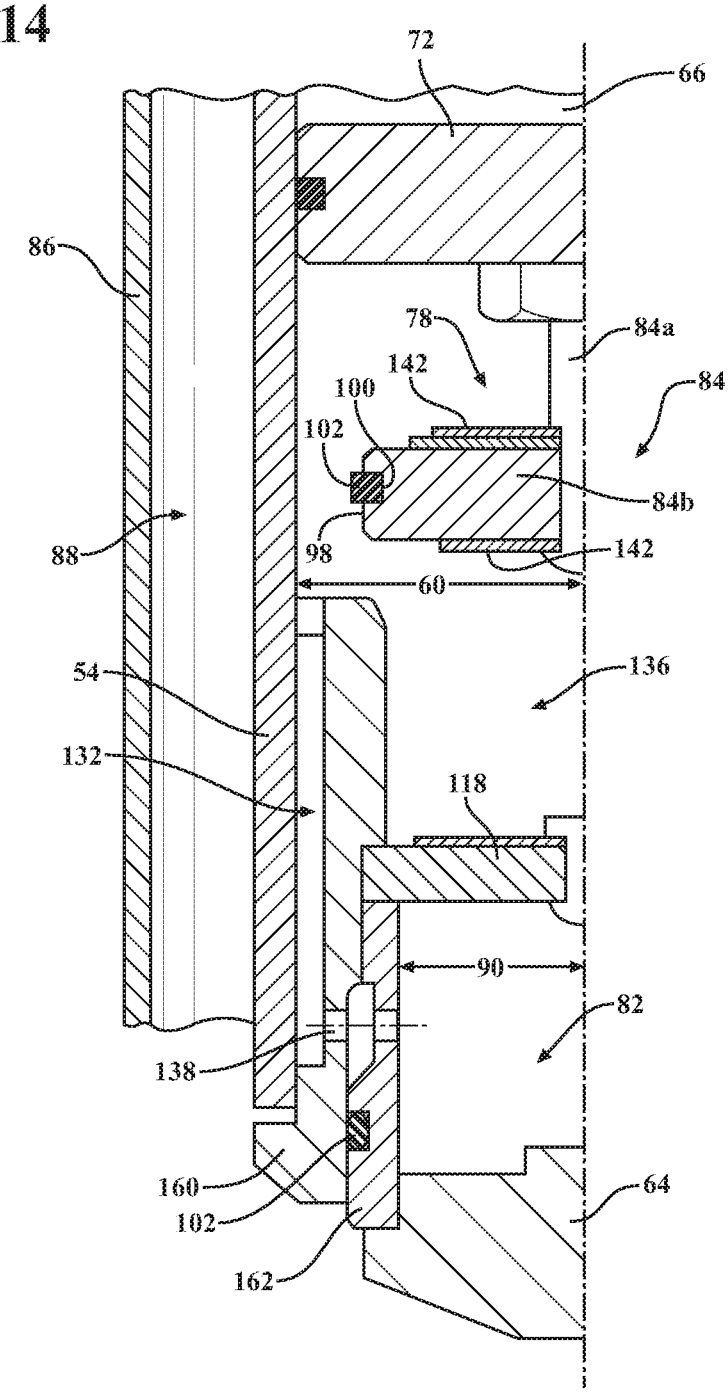
FIG. 14 is a partial, cross-sectional view of a shock absorber assembly including a bridge and a second compression valve assembly coupled to a rod according to another embodiment of the invention.

Typically, the second compression valve assembly 84b is a two-way valve in FIGS. 8 through 13 and 15, and a one-way valve in FIG. 14. However, it is to be appreciated that the second compression valve assembly 84*b* may be a one-way valve or a two-way valve depending on the configuration of the inner tube 80 without departing from the scope of the present invention. The second compression valve assembly 84*b* may also include valve discs 142 or the like for selectively restricting fluid flow through the second compression valve assembly 84*b*. Further, the second compression valve assembly 84*b*, as shown in FIGS. 8 through 13, has an outer surface 98 defining a notch 100 with the second compression valve assembly 84*b* including a seal 102 disposed within the notch 100. In some embodiments, the seal 102 may be comprised of cast-iron. It is to be appreciated that the seal 102 may be comprised of any other suitable material without departing from the scope of the present invention. The seal 102 disposed within the notch 100 is radially flexible with respect to the second compression valve assembly 84*b*.

Figure 9:
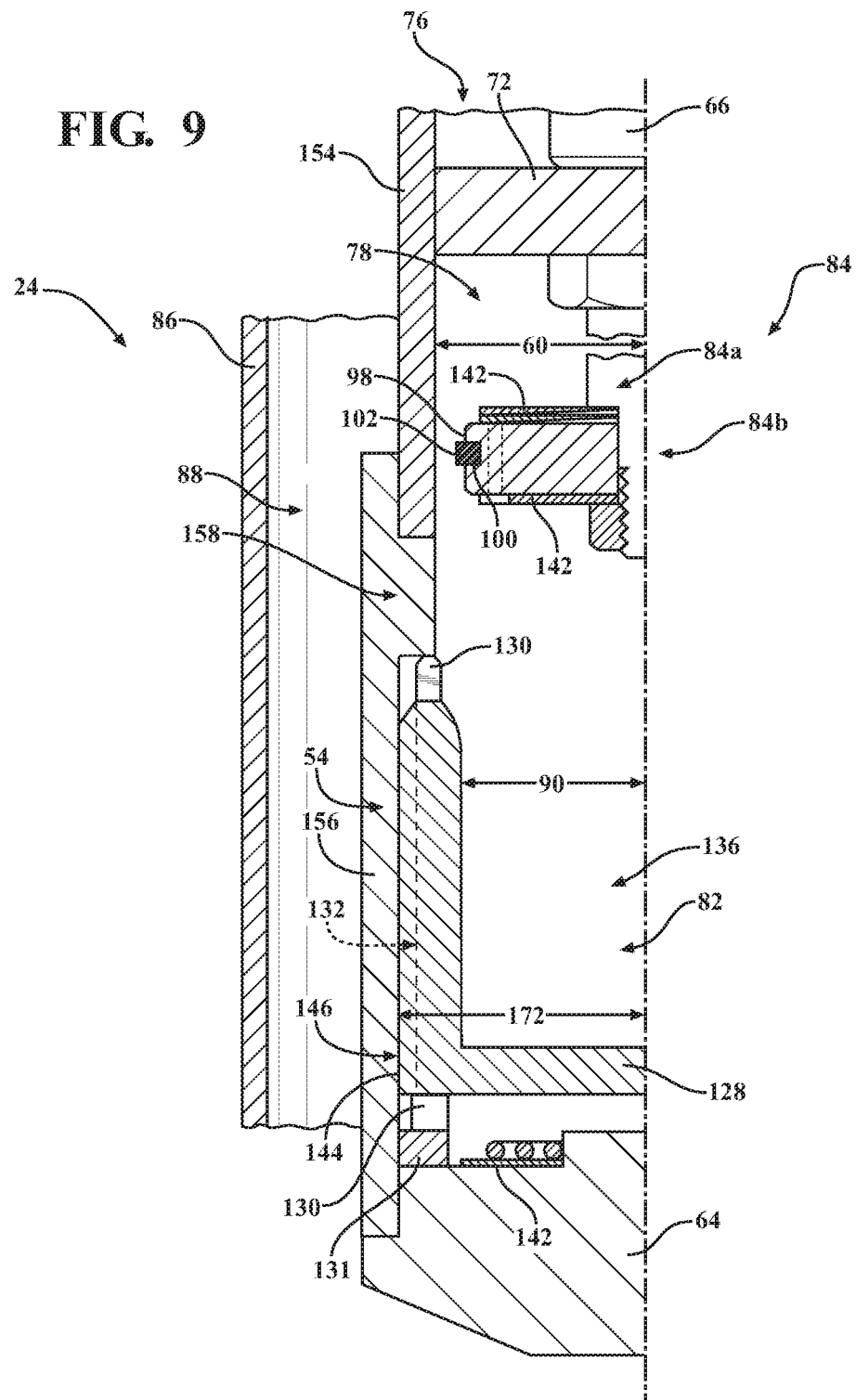
FIG. 9 is a partial, cross-sectional view of the shock absorber assembly of FIG. 8 including a plurality of legs disposed between an inner tube and a lower section according to another embodiment of the invention.
Figure 10:
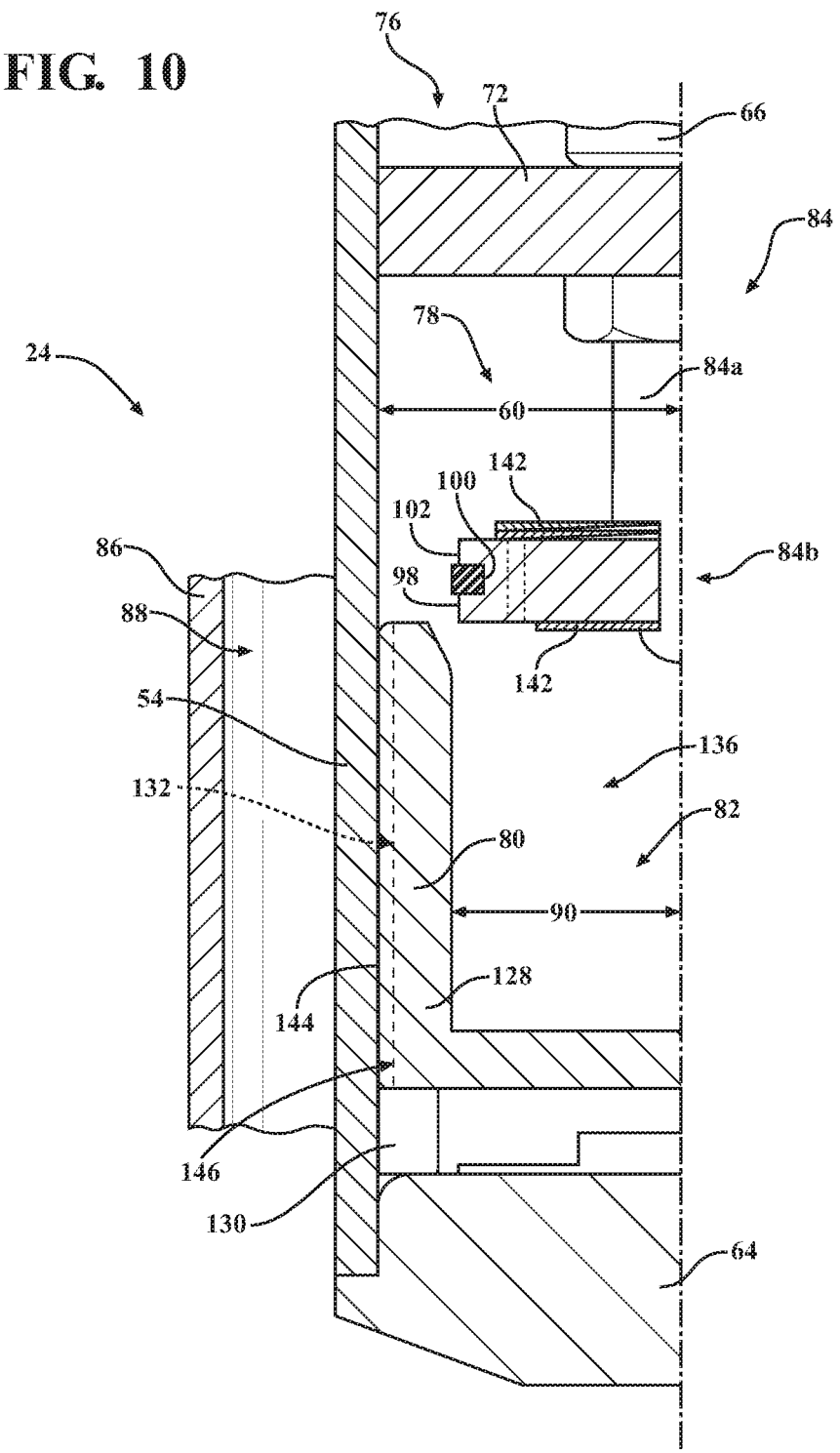
FIG. 10 is a partial, cross-sectional view of a shock absorber assembly including a second compression valve assembly coupled to an extender according to another embodiment of the invention.

FIGS. 8, 9, and 10 show the inner tube 80 having a plurality of ribs 144 defining a plurality of slots 146 between a portion of the inner tube 80 and the pressure tube 54. The plurality of slots 146 allows fluid to flow around the ribs during the compression stroke and the rebound stroke of the rod 66.

Figures 21, 22:
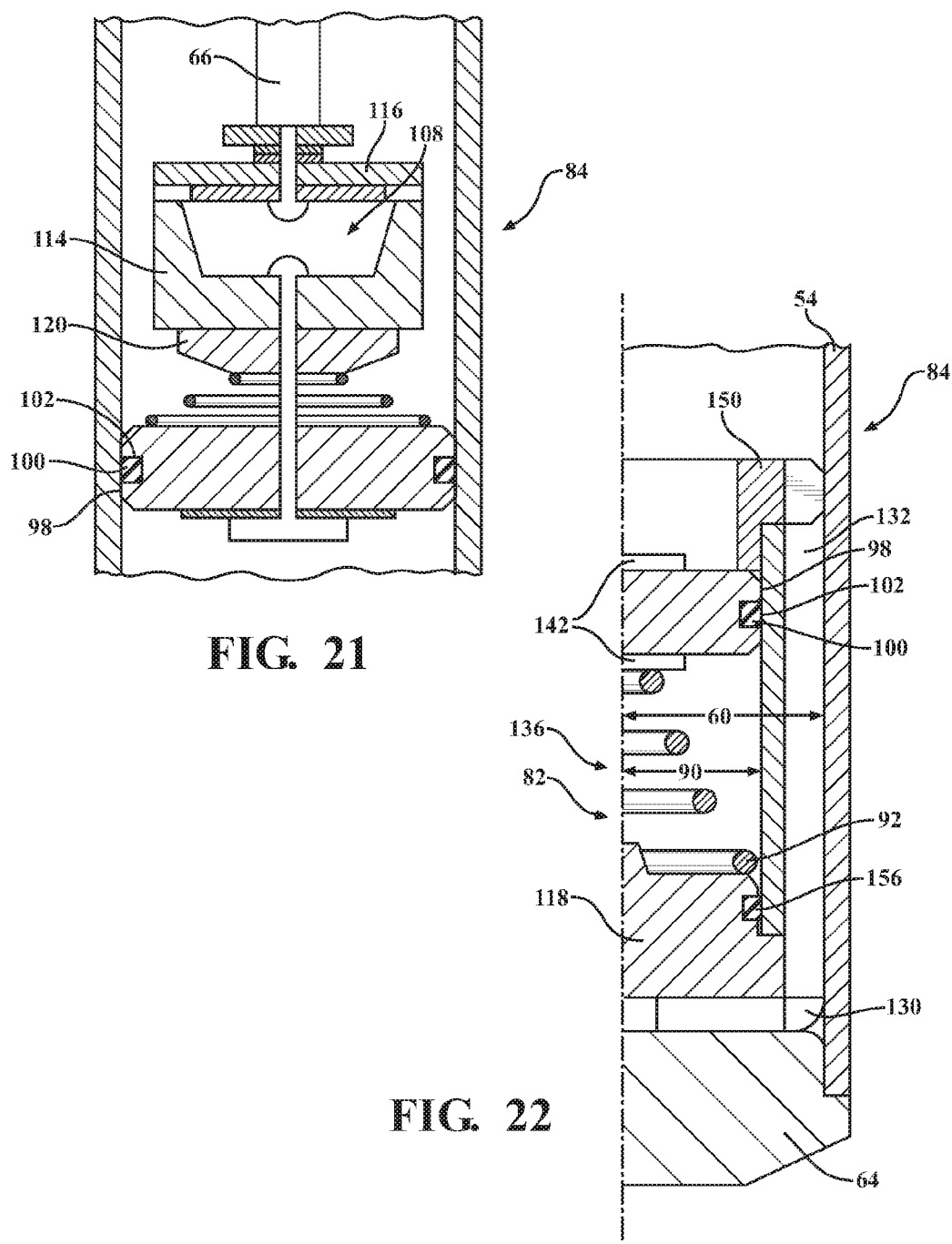
FIG. 21 is a close-up, cross-sectional view of a shock absorber assembly including a striker disc, a vessel, and a second compression valve assembly disposed within a bore according to another embodiment of the invention.
FIG. 22 is a partial, cross-sectional view of a shock absorber assembly including a plurality of caps and a second compression valve assembly disposed within a bore according to another embodiment of the invention.

As shown in FIGS. 8 through 13 and 15, the inner tube 80 is further defined as a cup 128. The cup 128 may be a molded cup, i.e., one-piece. The cup 128 may be made of a polymeric material. The cup 128 may be friction welded to the inner tube 80, as shown in FIG. 12, or the cup 128 may be spot welded to the inner tube, as shown in FIG. 21, or the cup can be press fit as is described above. In a preferred embodiment, the cup 128 has a plurality of ribs 144 having one or more crush ribs 145 thereon for engaging the cup 128 with the pressure tube 54. However, it is to be appreciated that the cup 128 shown in the Figures may be spot welded, friction welded, or attached to the pressure tube 54. It is also to be appreciated that the cup 128 may be spot welded, friction welded, or attached to the upper section 154, the lower section 156, or the adapter 158 in any suitable manner without departing from the scope of the present invention.

The cup 128 is typically an integrally molded cup, i.e., one-piece. When the cup is the integrally molded cup, the cup 128 typically is comprised of polymeric material. The cup 128 is typically molded from a polymeric material having excellent dimensional stability over a wide range of temperatures. It is to be appreciated that the polymeric material used for the cup 128 may include a reinforcement filler, which provides additional strength to the cup 128. The polymeric material may be, but is not limited to, a thermoplastic such as a polyamide or polyphenylene sulfide (PPS). In many embodiments the thermoplastic is glass filled for purposes of structural and thermal stability. For example, in one embodiment, the cup is comprised of, formed from, or consists of glass-filled PPS. In a preferred embodiment, the glass-filled PPS includes from about 20% to about 60% glass. Suitable grades of polymer are available from Solvay Specialty Polymers and Celanese.

The shock absorber assembly 24 as generally shown in FIGS. 3 through 15 is similar to the shock absorber assembly 24 shown in FIGS. 16 through 23, except that, as mentioned above, the second compression valve assembly 84*b* is coupled to the second end 70 of the rod 66 between the piston assembly 72 and the first compression valve assembly 64 in FIGS. 3 through 15, and the second compression valve assembly 84*b* is disposed within the lower working chamber 78 in FIG. 16 through 23. During the compression stroke and the rebound stroke of the rod 66, the shock absorber assembly 24 generally operates as described below, and differences between each embodiment will be described more specifically below with the corresponding Figure.

Figure 10A:
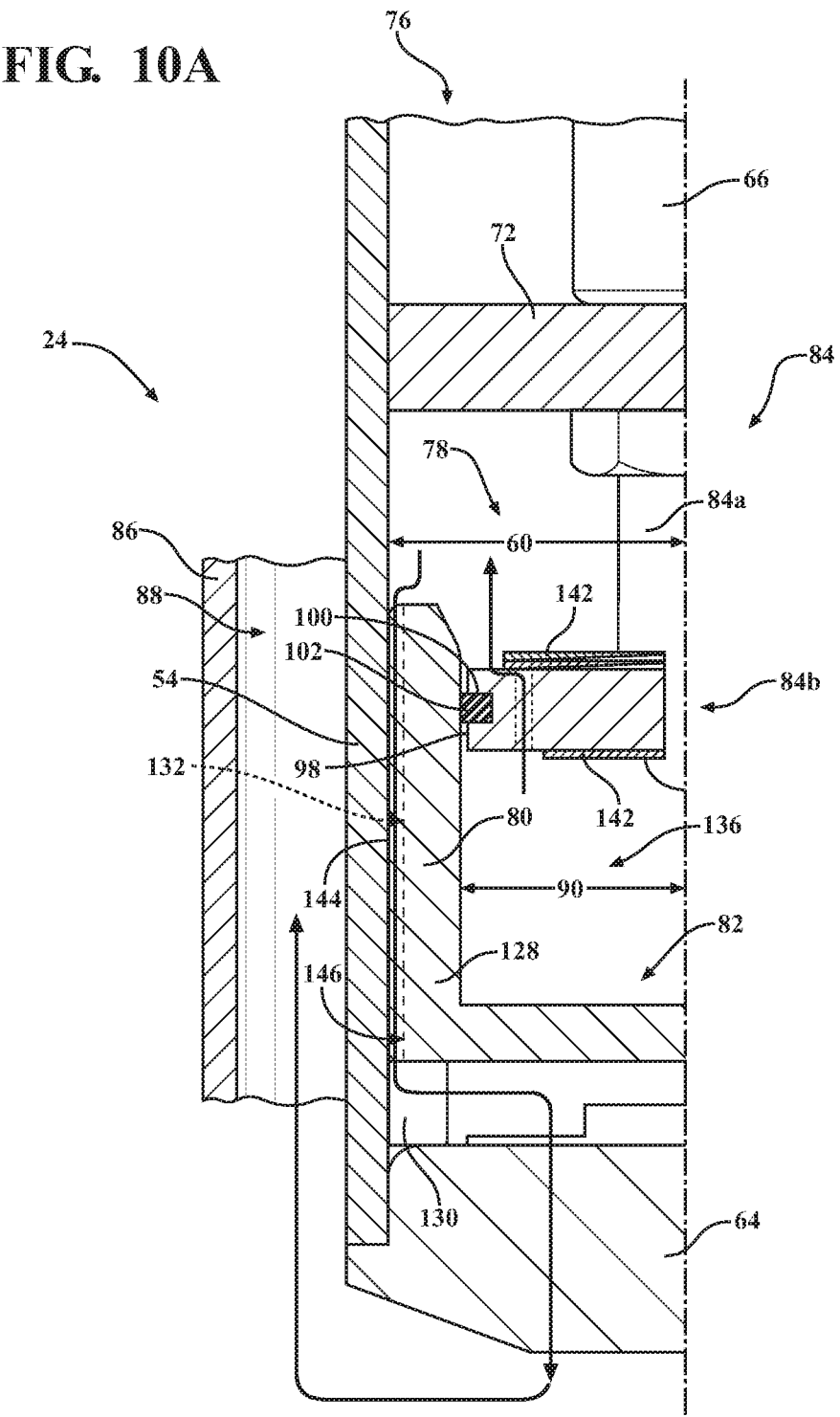
FIG. 10A is a partial, cross-sectional view generally showing the flow of oil through the shock absorber assembly of FIG. 10 during a compression stroke.

During the compression stroke of the rod 66, the rod 66 and the second compression valve assembly 84*b* move simultaneously toward the bore 82. As the rod 66 and, in turn, the second compression valve assembly 84*b* moves toward the bore 82, fluid flows from the lower cavity 136 through the second compression valve assembly 84*b* and into the lower working chamber 78. When the pressure from movement of the second compression valve assembly 84*b* toward the bore 82 exceeds the force restricting flow through the second compression valve assembly 84*b*, fluid flows from the lower cavity 136 into the lower working chamber 78. When fluid is flowing from the lower cavity 136 into the lower working chamber 78, fluid is also flowing from the lower working chamber 78 into the intermediate chamber 132. When fluid flows from the lower working chamber 78 into the intermediate chamber 132, the fluid flows through the passage 138 defined by the cup 128 and/or through or around the legs 130 into the first compression valve assembly 64. The fluid then flows from the first compression valve assembly 64 into the reservoir chamber 88. The reservoir chamber 88 is configured such that the volume of the rod 66 moving into the interior of the pressure tube 54, which decreases the volume that the fluid can occupy within the interior of the pressure tube 54, is able to move a corresponding volume of fluid to flow into the intermediate chamber 132, then into the first compression valve assembly 64, and then into the reservoir chamber 88. As an example, FIG. 10A is a partial, cross-sectional view generally showing the flow of oil through the shock absorber assembly of FIG. 10 during the compression stroke.

Figure 10B:
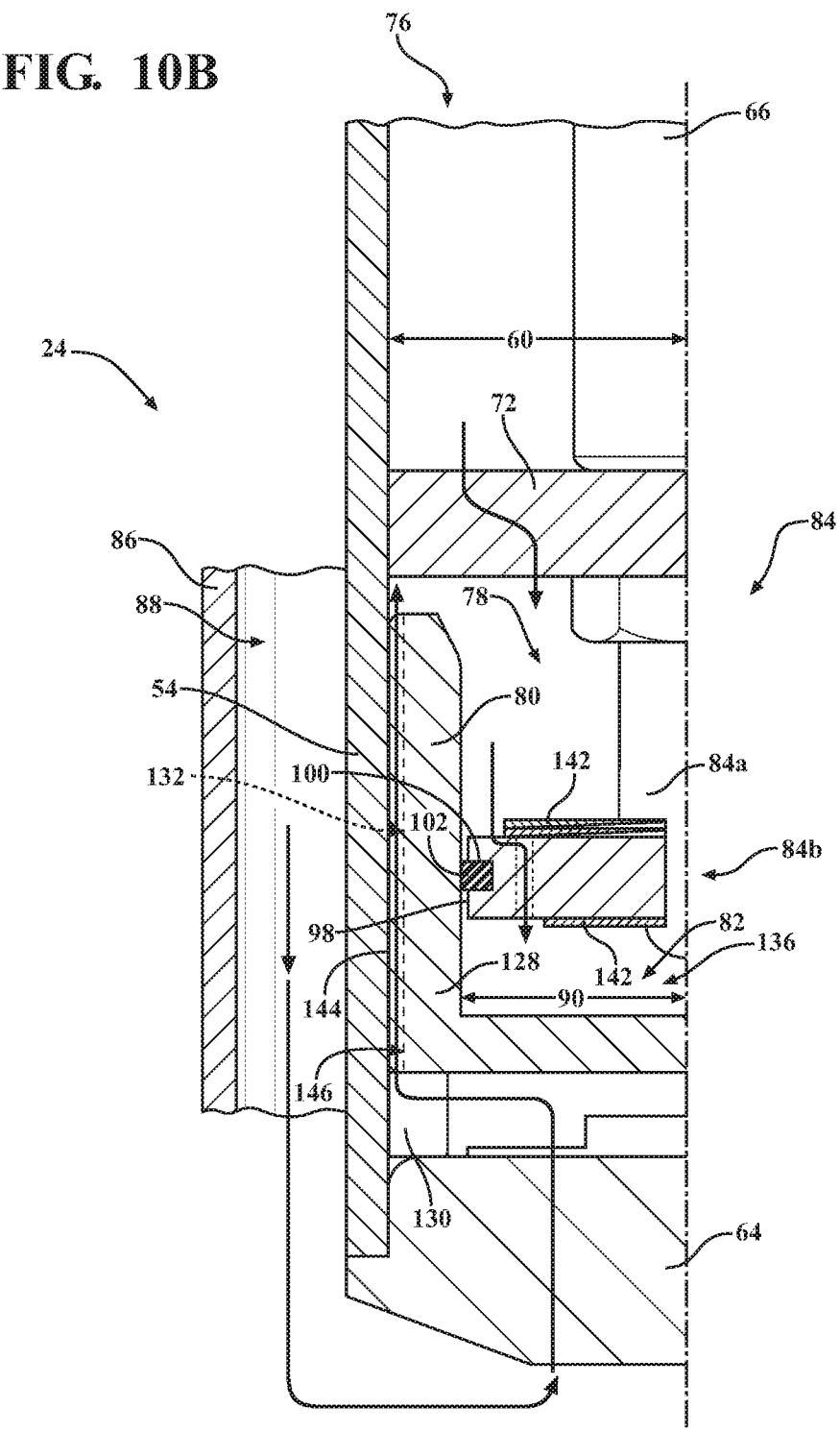
FIG. 10B is a partial, cross-sectional view generally showing the flow of oil through the shock absorber assembly of FIG. 10 during a rebound stroke.

During the rebound stroke of the rod 66, the rod 66 moves away from the first compression valve assembly 64 such that the second end 70 of the rod 66 and, in turn, the second compression valve assembly 84*b* moves out of the bore 82. During the rebound stroke, the fluid flows from the reservoir tube 86 into the first compression valve assembly 64, from the first compression valve assembly 64 into the intermediate chamber 132, and from the intermediate chamber 132 into the lower working chamber 78. Also, to refill the lower cavity 136 with fluid during the rebound stroke, fluid also flows through the second compression valve assembly 84*b* and into the lower cavity 136. Once the second compression valve assembly 84*b* is no longer in the bore 82, fluid is free to flow into both the lower working chamber 78 and the lower cavity 136 without having to interact with the second compression valve assembly 84*b*. The fluid flows due to a vacuum being created by the increased volume of the interior of the pressure tube 54 from a portion of the rod 66 moving out of the interior of the pressure tube 54. As an example, FIG. 10B is a partial, cross-sectional view generally showing the flow of oil through the shock absorber assembly of FIG. 10 during the rebound stroke.

It is to be appreciated that fluid may flow through first compression valve assembly 64, the second compression valve assembly 84*b*, and the piston assembly 72 in any order during the compression stroke and/or the rebound stroke of the rod 66. Depending on where the fluid flow is desired first, i.e., which depends on which of the first compression valve assembly 64, the second compression valve assembly 84*b*, and the piston assembly 72 has the least amount of resistance, the shock absorber assembly 24 can be tuned by changing the resistance of first compression valve assembly 64, the second compression valve assembly 84b, and the piston assembly 72. This allows for a tunable shock absorber assembly 24.

In the shock absorber assembly 24 shown in FIG. 8 the inner tube 80 is press fit against the pressure tube 54. As mentioned above when describing FIG. 18, the press fit typically occurs at multiple different points, i.e., where the ribs 144 are located, but it is to be appreciated that the press fit may occur at any number of points without departing from the scope of the present invention. Said differently, in many embodiments, the ribs 144 (with or without one or more crush ribs 145) engage the cup 128 with the pressure tube 54 via a press fit. Legs 130 support the inner tube 80 and allow fluid to flow through or around the legs 130.

The shock absorber assembly as shown in FIG. 9 includes a plurality of legs 130 disposed between the lower section 156 and the inner tube 80. The second compression valve assembly 84b shown in FIG. 9 typically is the RV+ rebound valve readily available from Tenneco Inc. However, it is to be appreciated that any other second compression valve assembly 84b may be used without departing from the scope of the present invention.

The shock absorber assembly 24 shown in FIG. 10 is similar to the shock absorber assembly 24 shown in FIG. 8 in structure and in function except that the pressure tube 54 is not defined as the upper section 154 and the lower section 156. The second compression valve assembly 84b shown in FIG. 10 typically is the RV+ rebound valve readily available from Tenneco Automotive Operating Company Inc. However, it is to be appreciated that any other second compression valve assembly 84b may be used without departing from the scope of the present invention.

Figure 11:
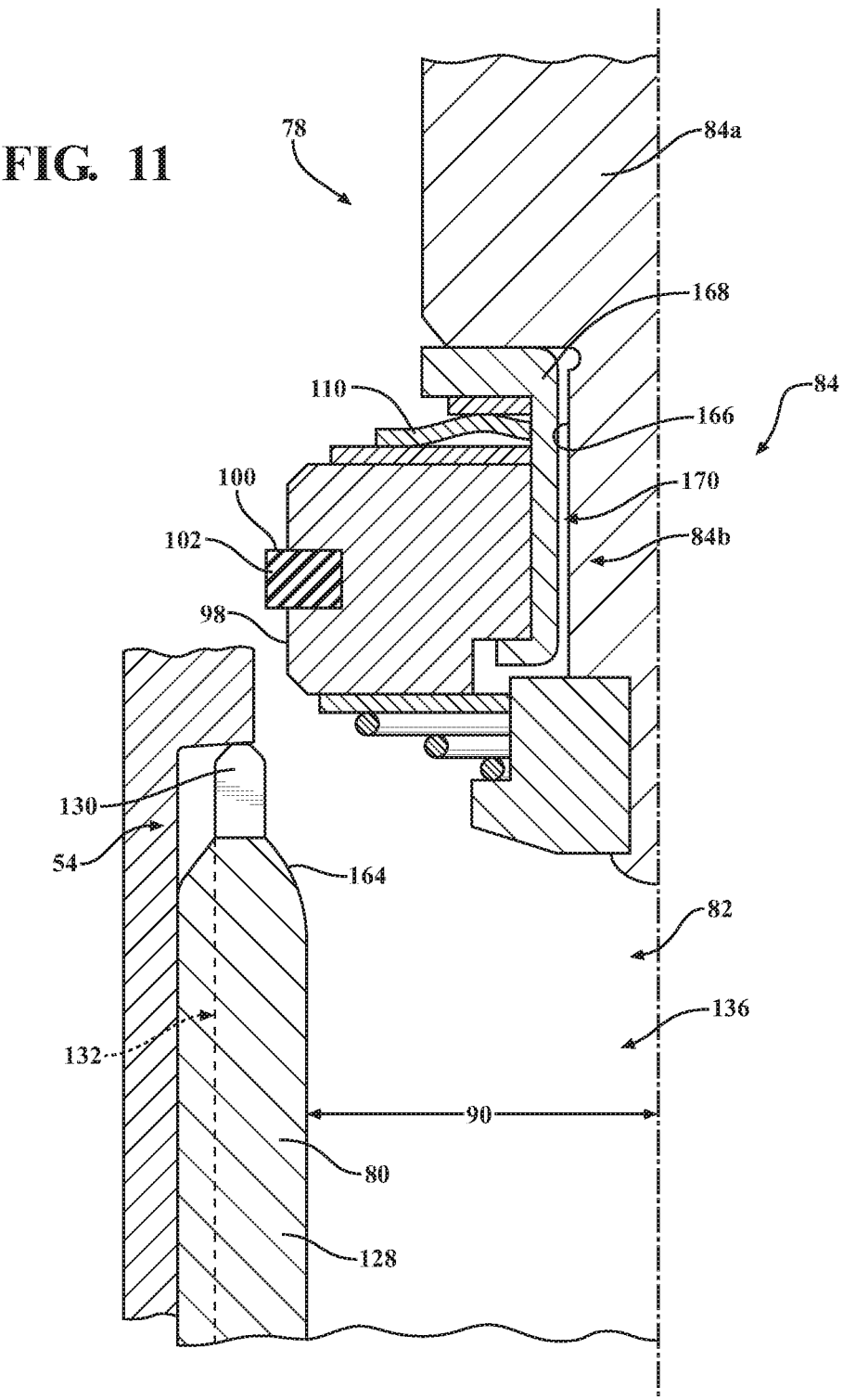
FIG. 11 is a partial, cross-sectional view of a shock absorber assembly including a cup, a plurality of legs disposed between the inner tube and the pressure tube, and a second compression valve assembly coupled to a rod according to another embodiment of the invention.

In the shock absorber assembly 24 as shown in FIG. 11, the extender 84a defines an indent 166. In this embodiment, the shock absorber assembly 24 includes a sleeve 168 disposed within the indent 166. The sleeve 168 and the extender 84a are spaced from one another such that a gap 170 remains defined therebetween. The second compression valve assembly 84b is coupled to both the extender 84a and the sleeve 168 such that the second compression valve assembly 84b moves in unison with the extender 84a during the compression stroke and the rebound stroke. At least one disc 110 may be used to press fit the sleeve 168 and the second compression valve assembly 84b to limit vertical movement of the second compression valve assembly 84b with respect to the extender 84a.

Of course, in an embodiment such as that described in FIG. 11, the rod 66 of the shock absorber assembly 24 can define an indent 166 between the first end 68 and the second end 70 (as an alternative to the extender). In such an embodiment, the shock absorber assembly 24 includes a sleeve 168 disposed within the indent 166. The sleeve 168 and the rod 66 are spaced from one another such that a gap 170 remains defined therebetween. The second compression valve assembly 84b is coupled to both the rod 66 and the sleeve 168 such that the second compression valve assembly 84b moves in unison with the rod 66 during the compression stroke and the rebound stroke. At least one disc 110 may be used to press fit the sleeve 168 and the second compression valve assembly 84b to limit vertical movement of the second compression valve assembly 84b with respect to the rod 66.

During the compression stroke and rebound stroke of the rod 66, the second compression valve assembly 84b is moveable in a first and second direction transverse to the rod 66. In other words, when the second compression valve assembly 84b begins to contact the inner tube 80, the second compression valve assembly 84b moveable in a direction transverse to the movement of the rod 66 such that the second compression valve assembly 84b is centered with respect to the inner tube 80. Movement of the second compression valve assembly 84b in a direction transverse to the movement of the rod 66 is due to the gap defined between the sleeve 168 and the rod 66, which allows the sleeve 168 and, in turn, the second compression valve assembly 84b to move into and out of the gap 170. It is to be appreciated that the gap 170 may be defined between the second compression valve assembly 84b and the rod 66 without the use of the sleeve 168 without departing from the scope of the present invention. The inner tube 80 also includes an angled surface 164 for further assisting with the centering of the second compression valve assembly 84b during the compression stroke of the rod 66. Further, the seals 102 on the second compression valve assembly 84b further help center the second compression valve assembly 84b within the bore 82, and prevents leakage of fluid between the second compression valve assembly 84b and the inner tube 80.

The second compression valve assembly 84b shown in FIG. 11 typically is the RV+ rebound valve readily available from Tenneco Automotive Operating Company Inc. However, it is to be appreciated that any other second compression valve assembly 84b may be used without departing from the scope of the present invention.

The shock absorber assembly 24 shown in FIG. 12 shows a different configuration for the cup 128. The cup 128 is typically friction welded with the adapter 158 in at least one spot. It is to be appreciated that the cup 128 may be spot welded with the adapter 158 without departing from the scope of the present invention. It is also to be appreciated that the cup 128 may be friction welded or spot-welded to the upper section 154 and/or the lower section 156 of the pressure tube, or attached to the pressure tube 54 in any suitable manner, without departing from the scope of the present invention. To allow fluid to flow between the intermediate chamber 132 and the lower working chamber 78/lower cavity 136, the cup 128 defines at least one passage 138.

The shock absorber assembly 24 as shown in FIG. 13 is similar to FIG. 11 in structure and in function except that the rod 66 and the second compression valve assembly 84b have a different configuration. The shock absorber assembly 24 shown in FIG. 11 includes legs 130 disposed between the inner tube 80 and the pressure tube 54. Specifically, the legs 130 are disposed between the inner tube 80 and the adapter 158. The shock absorber assembly 24 shown in FIG. 13 functions similarly to the shock absorber assembly shown in FIG. 8, except the fluid flows around or through the legs 130 during the compression stroke and the rebound stroke of the rod 66.

The shock absorber assembly 24 shown in FIG. 14 includes a bridge 118 disposed within the bore 82. In this embodiment, the inner tube 80 is further defined as first inner tube 160 and a second inner tube 162 with the bridge 118 disposed between the first inner tube 160 and the second inner tube 162. The first inner tube 160 and the second inner tube 162 allow fluid to flow through a passage 138 defined therethrough, which fluidly connects the intermediate chamber 132 with the lower cavity 136. Typically, the second compression valve assembly 84b is a two-way valve; however, if the bridge 118 allows fluid to flow therethrough, the second compression valve assembly 84b may be a one-way valve. The shock absorber assembly 24 shown in FIG. 14 includes legs 130 disposed between the pressure tube 54 and the inner tube 80. Specifically, the legs 130 are disposed between the first inner tube 160 and the pressure tube 54. In this embodiment, the legs 130 are typically loose, i.e., not press fit between the pressure tube and the first inner tube 160. However, the first inner tube 160, the second inner tube 162, and the pressure tube 54 are typically press fit against one another. The shock absorber assembly 24 also includes a seal 102 disposed between the second inner tube 162 and the first inner tube 160 for blocking fluid from flowing between one another.

Figure 15:
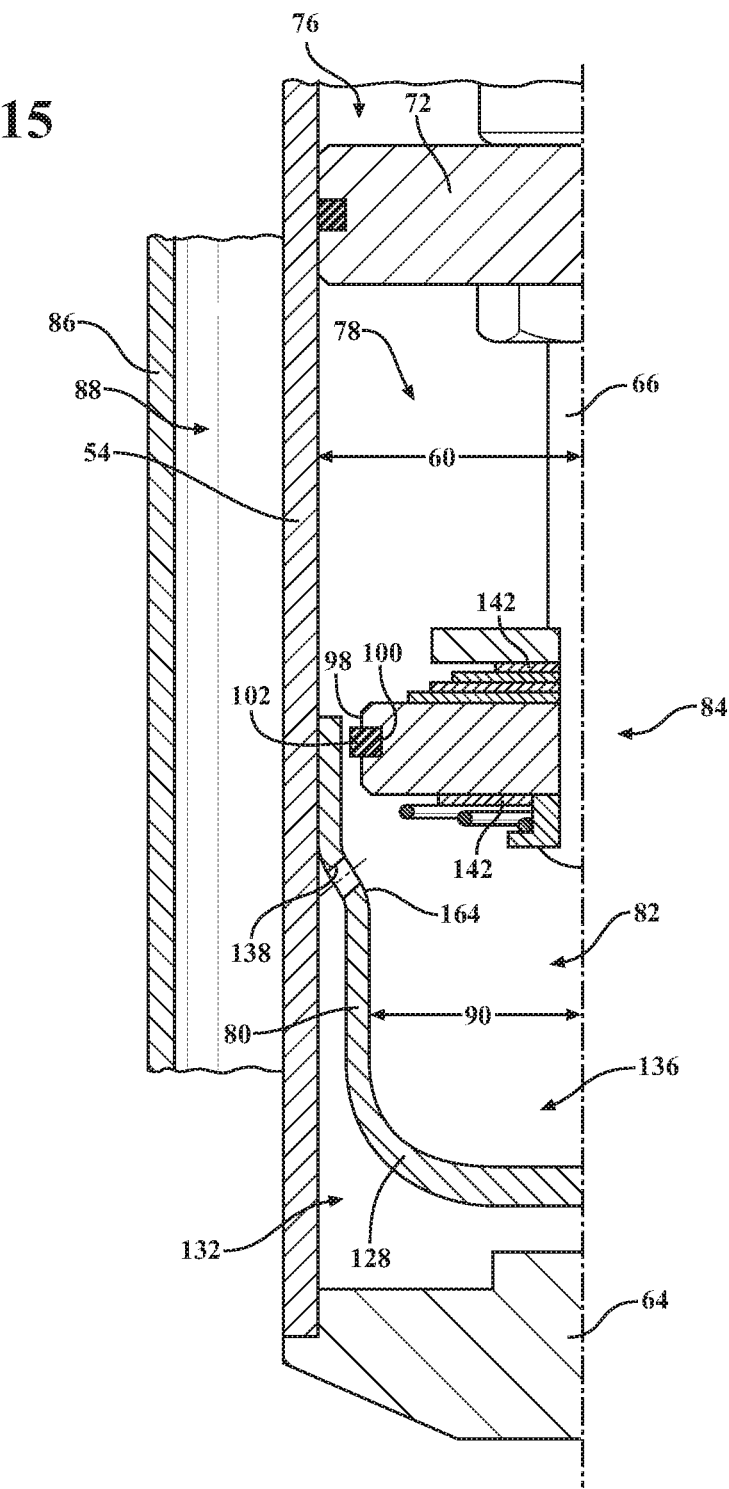
FIG. 15 is a partial, cross-sectional view of a shock absorber assembly including a cup spot welded to a pressure tube, and a second compression valve assembly coupled to a rod according to another embodiment of the invention.

The shock absorber assembly 24 shown in FIG. 15 is similar to the shock absorber assembly 24 shown in FIG. 12 in structure and in function except that the pressure tube 54 is not defined as the upper section 154 and the lower section 156. To fix the cup 128 to the pressure tube 54, the cup 128 is spot-welded to the pressure tube 54. However, it is to be appreciated that any other suitable means for fixing the cup 128 to the pressure tube 54 may be used without departing from the scope of the present invention. The cup 128 defines at least one passage 138 for allowing fluid to flow between the intermediate chamber 132 and the lower working chamber 78/lower cavity 136. The cup 128 has an angled surface 164, which allows the seal 102 in the second compression valve assembly 84b to center with respect to the cup 128 and to better engage with the cup 128 within the bore 82. The shock absorber assembly 24 also includes a biasing member 92 and a valve disc 142 for restricting fluid flow through the second compression valve assembly 84b. The seal 102 is radially flexible within the notch 100.

The shock absorber assembly 24 as generally shown in FIGS. 16 through 23 is similar to the shock absorber assembly 24 shown in FIGS. 3 through 15 except that, as mentioned above, the second compression valve assembly 84b is disposed within the lower working chamber 78 as opposed to being coupled to the second end 70 of the rod 66 between the piston assembly 72 and the first compression valve assembly 64.

As shown in FIGS. 16 through 23, the inner tube 80 has a second diameter 90 less than the first diameter 60 of the pressure tube 54. Since the second diameter 90 is less than the first diameter 60, the pressure tube 54 and the inner tube 80 can accommodate the piston assembly 72 and the second compression valve assembly 84b, respectively. The second compression valve assembly 84b is suspended within the bore 82. To keep the second compression valve assembly 84b suspended within the bore 82, the shock absorber assembly 24 includes a biasing member 92 disposed within the bore 82 for biasing the second compression valve assembly 84b away from the first compression valve assembly 64. To keep the second compression valve assembly 84b from exiting the bore 82, a retaining ring 94 is disposed within the bore 82 and engages the second compression valve assembly 84b to retain the second compression valve assembly 84b within the bore 82.

Specifically, as shown in FIGS. 16 through 21 and 23, the inner tube 80 defines a groove 96 radially about the bore 82 with the retaining ring 94 partially disposed within the groove 96. The groove 96 may, however, be defined as shown in FIG. 23, which keeps the second compression valve assembly 84b from exiting the bore 82 and helps center the second compression valve assembly 84b with respect to the inner tube 80. The groove 96 shown in FIG. 23 also allows fluid to flow therethrough, which provides additional hydraulic dampening. Typically the grooves are defined 90 degrees away from one another about the inner tube 80; however, it is to be appreciated that any number of grooves 96 may be defined about the inner tube 80 without departing from the scope of the present invention. It is to be appreciated that the inner tube 80 may define a groove 96 having any other suitable configuration without departing from the scope of the present invention.

The second compression valve assembly 84b has an outer surface 98 defining a notch 100 with the second compression valve assembly 84b including a seal 102 disposed within the notch 100. The seal 102 disposed within the notch 100 of the second compression valve assembly 84b is radially flexible with respect to the second compression valve assembly 84b. Although the seal 102 may be a standard o-ring seal, it is to be appreciated that the seal 102 may be any suitable type of seal 102 without departing from the scope of the present invention.

In certain embodiments, as shown in FIGS. 17 through 20, the shock absorber assembly 24 includes a striker plate 104 coupled to the rod 66 for engaging with the second compression valve assembly 84b during the compression stroke of the rod 66 toward the first compression valve assembly 64. Including the striker plate 104 in the shock absorber assembly 24 helps decrease noise, helps further dampen vibrations during the compression stroke of the rod 66, and reduces wear on the second compression valve assembly 84b. The striker plate 104 defines at least one hole 106. Since the lower working chamber 78 is filled with fluid, the hole 106 allows fluid to escape through a cove 108 defined between the striker plate 104 and the second compression valve assembly 84b when the striker plate 104 engages the second compression valve assembly 84b. In other words, the striker plate 104 allows for additional hydraulic dampening between the rod 66 and the second compression valve assembly 84b.

Figure 19:
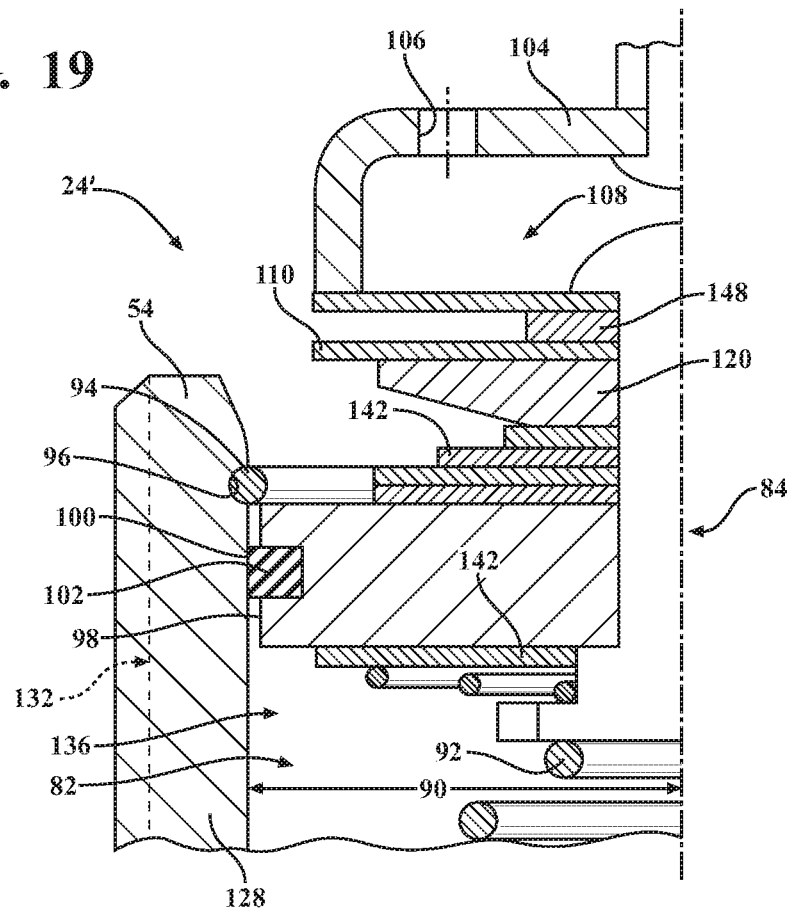
FIG. 19 is a close-up, cross-sectional view of a shock absorber assembly including a striker plate, at least one disc, and a second compression valve assembly disposed within a bore according to another embodiment of the invention.
Figure 20:
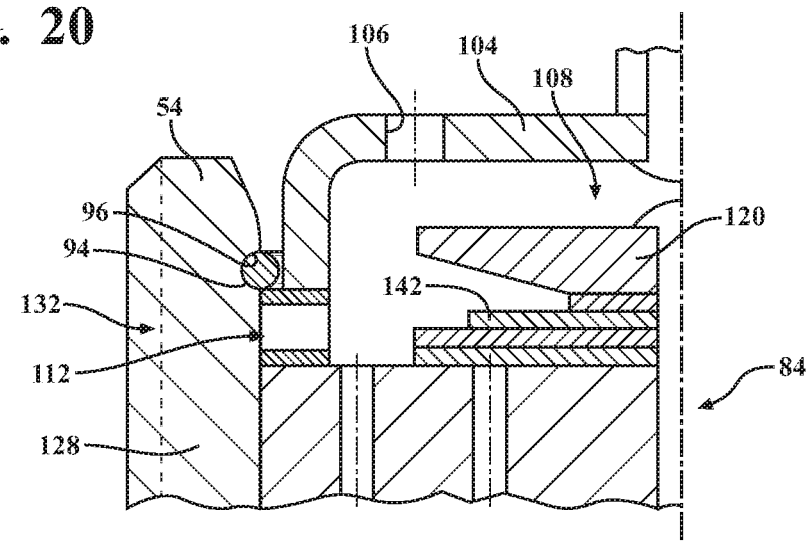
FIG. 20 is a close-up, cross sectional view of the shock absorber assembly of FIG. 19 including a wave spring according to another embodiment of the shock absorber assembly.

In one embodiment, as shown in FIG. 19, the second compression valve assembly 84b includes at least one disc 110. The striker plate 104 abuts the disc 110 during the compression stroke of the rod 66. The disc 110 flexes to provide mechanical dampening between the rod 66 and the second compression valve assembly 84b. In another embodiment, as shown in FIG. 20, the second compression valve assembly includes a wave spring 112. The striker plate 104 abuts the wave spring 112 during the compression stroke of the rod 66, which provides mechanical dampening between the rod 66 and the second compression valve assembly 84b. It is to be appreciated that any other suitable configuration for the striker plate 104, the disc 110, the wave spring 112, and any other suitable combinations may be used without departing from the scope of the present invention.

Another embodiment of the striker plate 104 is shown in FIG. 21. In this embodiment, the second compression valve assembly 84b includes a vessel 114, and the striker plate 104 is further defined as at least one striker disc 116. The striker disc 116 abuts the vessel 114 during the compression stroke of the rod 66. The striker disc 116 and the vessel 114 define the cove 108 when engaged with one another. Since the lower working chamber 78 is filled with fluid, the fluid flows between the striker disc 116 and the vessel 114 to escape the cove 108 when the striker disc 116 engages the second compression valve assembly 84b during the compression stroke of the rod 66. In other words, the striker disc 116 allows for additional hydraulic dampening between the rod 66 and the second compression valve assembly 84b due to fluid flowing between the striker disc 116 and the vessel 114, and the striker disc 116 allows for additional mechanical dampening due to the striker disc 116 flexing when engaged with the vessel 114 during the compression stroke of the rod 66. It is to be appreciated that the striker disc 116 shown in FIG. 21 is merely illustrative and may differ in design, appearance, and/or function without departing from the scope of the present invention.

Figure 16:
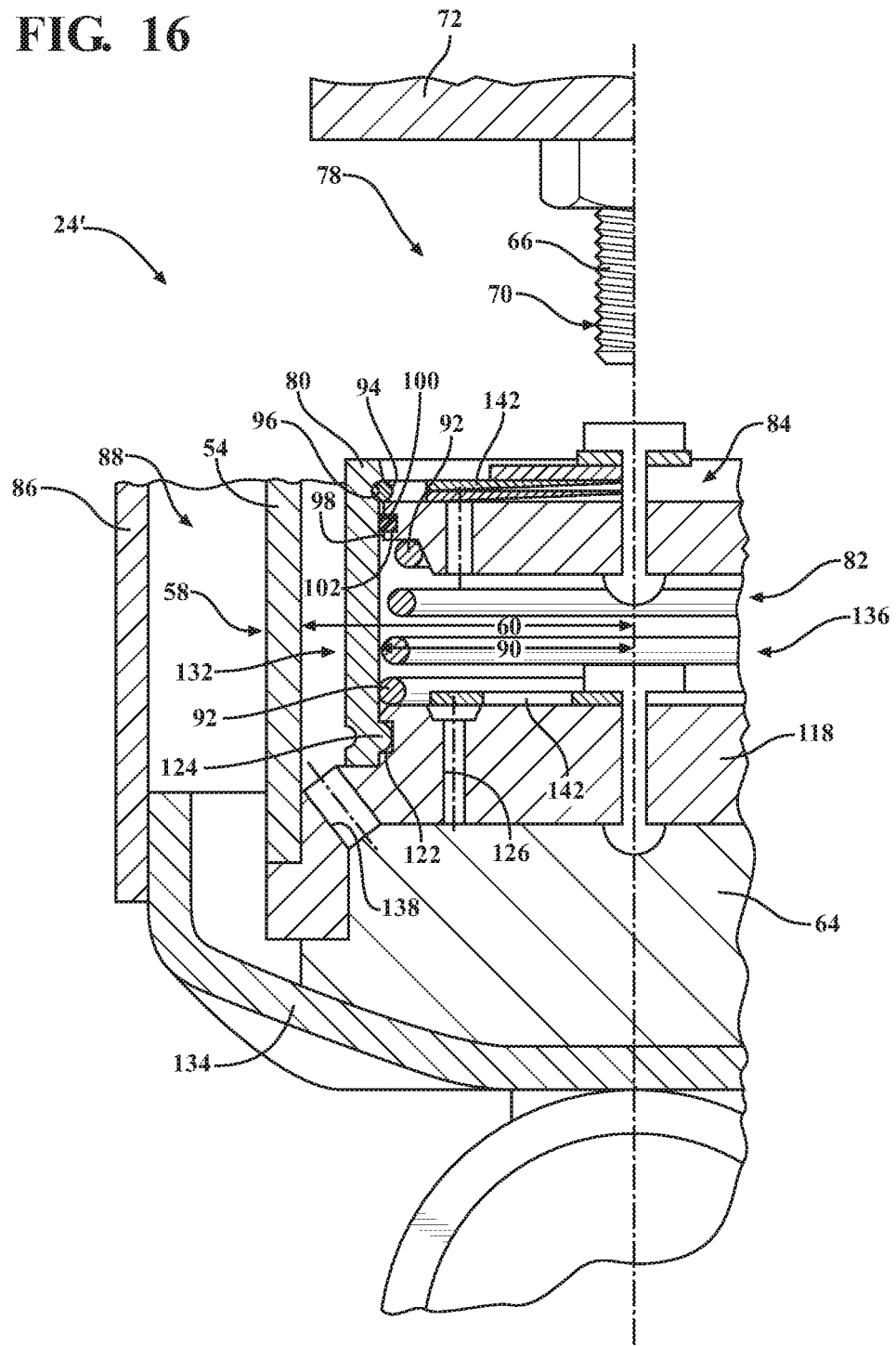
FIG. 16 is a partial, cross-sectional view of a shock absorber assembly including a second compression valve assembly disposed within a bore according to one embodiment of the invention.
Figure 17:
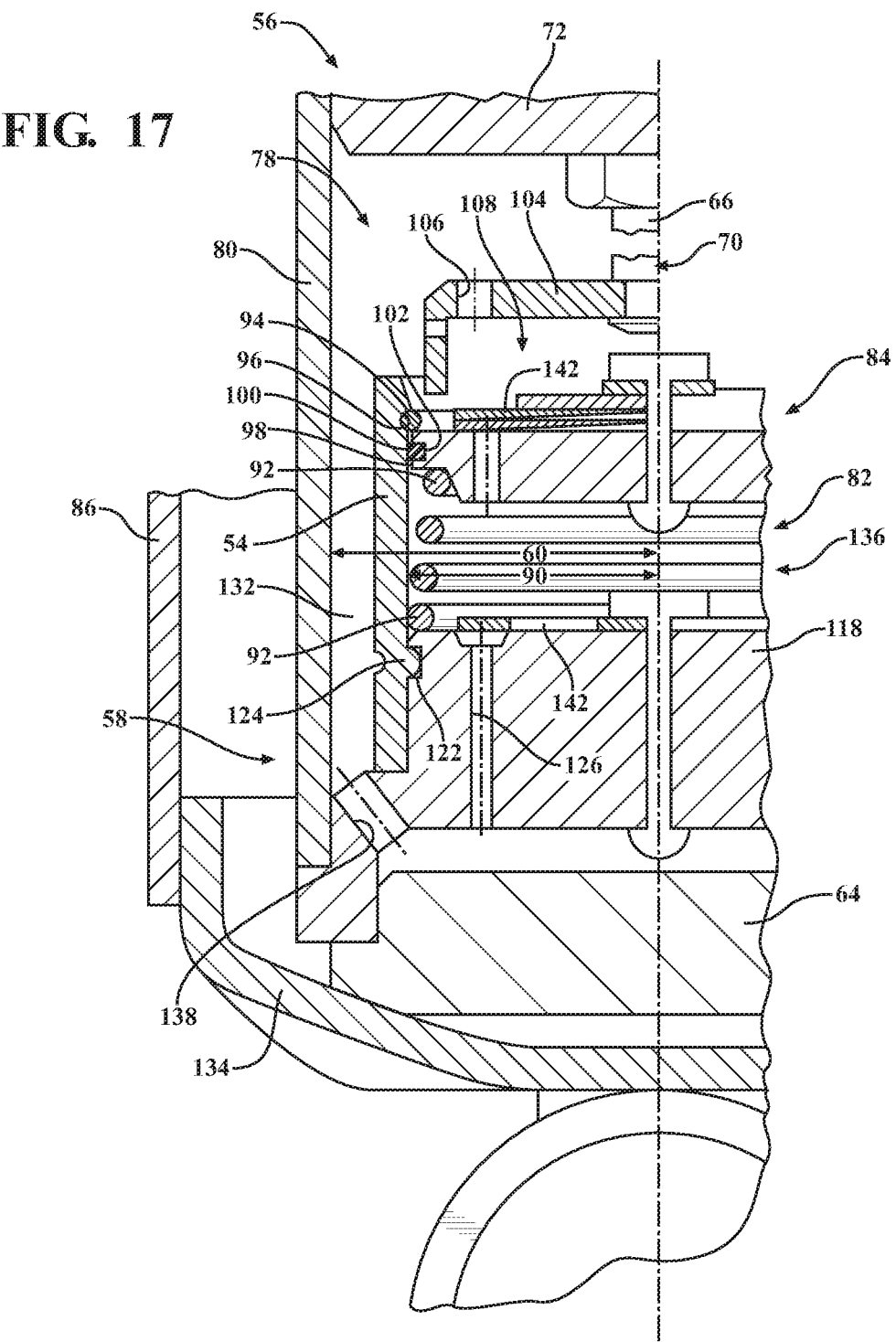
FIG. 17 is a partial, cross-sectional view of the shock absorber assembly of FIG. 16 including a striker plate.

As shown in FIGS. 16 through 23, the shock absorber assembly 24 has various configurations for further defining the bore 82. For example, as shown in FIGS. 16, 17, and 22, the shock absorber assembly 24 includes a bridge 118 interconnecting with the first compression valve assembly 64 and the inner tube 80 for further defining the bore 82. As shown in FIGS. 16 and 17, the bridge 118 has a perimeter and defines a crease 122 about the perimeter. The inner tube 80 has a crimp 124 extending into the crease 122 for radially fixing the inner tube 80 to the bridge 118. The bridge 118 defines at least one void 126 for allowing fluid to flow therein during the compression stroke and the rebound stroke of the rod 66.

Figure 18:
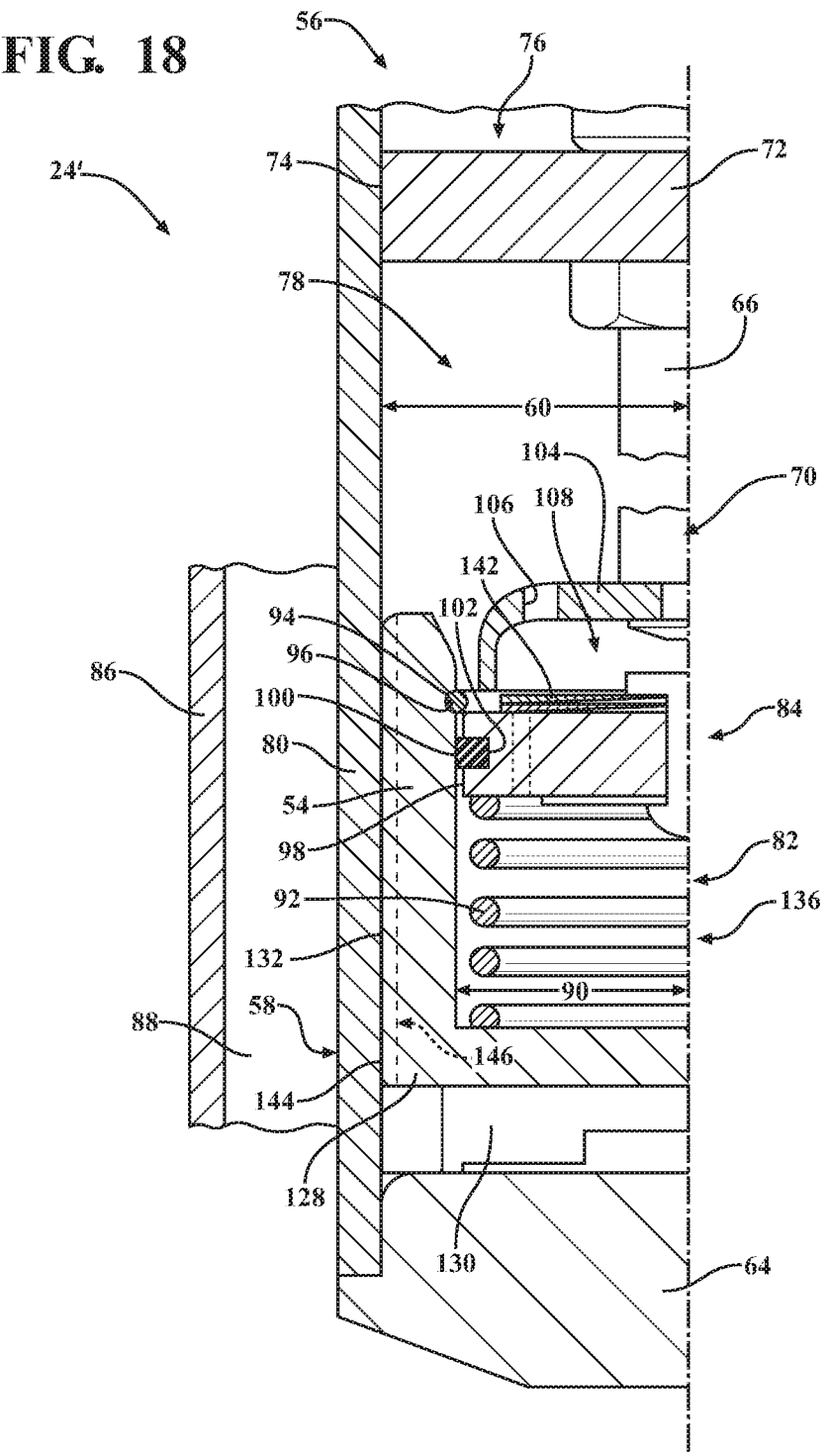
FIG. 18 is a partial, cross-sectional view of a shock absorber assembly including a cup, a plurality of legs, and a second compression valve assembly disposed within a bore according to another embodiment of the invention.

Other configurations of the shock absorber assembly 24 for defining the bore are shown in FIGS. 18 and 23. In FIGS. 18 and 23, the inner tube 80 is further defined as a cup 128 with the cup 128 further defining the bore 82. When the bore 82 is defined by the cup 128, it eliminates the need for the bridge 118. To accommodate fluid flow in this embodiment, the shock absorber assembly 24 includes a plurality of legs 130 disposed between and coupled to the cup 128 and the first compression valve assembly 64 for allowing fluid to flow between the cup 128 and the first compression valve assembly 64 during both the compression stroke and the rebound stroke of the rod 66. The legs 130 may be adjusted in size to accommodate different cups 128, first compression valve assemblies 64, and second compression valve assemblies 84b. The legs 130 may define passages therein for fluid to flow, or the legs 130 may be spaced from one another to allow fluid to flow therebetween. However, it is to be appreciated that any suitable number of legs 130 may be used without departing from the scope of the present invention. The cup 128 is typically an integrally molded cup, i.e., one-piece. When the cup 128 is the integrally molded cup, the cup 128 typically is comprised of polymeric material. For example, the polymeric material may be, but is not limited to, a polyamide-imide. For example, suitable grades of polyamide-imide are commercially available from Solvay Specialty Polymers under the trade name Torlon®. It is to be appreciated that the polymeric material used for the cup 128 may include a reinforcement filler, which provides additional strength to the cup 128.

As discussed above, FIG. 16 represents the configuration of the shock absorber assembly 24 having the second compression valve assembly 84b suspended within the bore 82. Also, the second compression valve assembly 84b in FIG. 16 is further defined as a one-way valve assembly such that fluid flows through the second compression valve assembly 84b during the compression stroke of the rod 66. As represented in FIG. 16, the shock absorber assembly 24 defines an intermediate chamber 132 between the inner tube 80 and the pressure tube 54. The shock assembly absorber 24 also includes an end cap 134 adjacent the lower end 58 of the pressure tube 54 for supporting the bridge 118. Further, the shock absorber assembly 24 has a reservoir chamber 88 defined between the pressure tube 54 and the reservoir tube 86, a lower cavity 136 defined between the bridge 118 and the second compression valve assembly 84b, and at least one passage 138 and at least one void 126 defined by the bridge 118. The upper working chamber 76, the lower working chamber 78, the intermediate chamber 132, the lower cavity 136, and the reservoir chamber 88 are fluidly connected to one another.

During a compression stroke of the rod 66 in FIG. 16, the rod 66 contacts the second compression valve assembly 84b, which drives the second compression valve assembly 84b toward the bridge 118. As the rod 66 and, in turn, the second compression valve assembly 84b moves toward the bridge 118, fluid flows from the lower cavity 136 through the second compression valve assembly 84b and into the lower working chamber 78. The second compression valve assembly 84b includes at least one valve disc 142 restricting flow from the lower cavity 136 into the lower working chamber 78. When the pressure from movement of the second compression valve assembly 84b toward the bridge 118 exceeds the force keeping the valve disc 142 against the second compression valve assembly 84b, fluid flows from the lower cavity 136 into the lower working chamber 78. When fluid is flowing from the lower cavity 136 into the lower working chamber 78, fluid is also flowing from the lower working chamber 78 into the intermediate chamber 132. When fluid flows from the lower working chamber 78 into the intermediate chamber 132, the fluid flows through the passage 138 defined by the bridge 118 into the first compression valve assembly 64. The fluid then flows from the first compression valve assembly 64 into the reservoir chamber 88. The reservoir chamber 88 is configured such that the volume of the rod 66 moving into the interior of the pressure tube 54, which decreases the volume that the fluid can occupy within the interior of the pressure tube 54, is able to move a corresponding volume of fluid to flow into the intermediate chamber 132, then into the first compression valve assembly 64, and then into the reservoir chamber 88.

During the rebound stroke of the rod 66, the rod 66 moves away from the first compression valve assembly 64 such that the rod 66 disengages with the second compression valve assembly 84b when the second compression valve assembly 84b engages the retaining ring 94. During the rebound stroke, the fluid flows from the reservoir tube 86 into the first compression valve assembly 64, from the first compression valve assembly 64 into the passage 138, from the passage 138 into the intermediate chamber 132, and from the intermediate chamber 132 into the lower working chamber 78. Also, to refill the lower cavity 136 with fluid during the rebound stroke, fluid also flows from the first compression valve assembly 64 through the void 126 and into the lower cavity 136. The bridge 118 also has a valve disc 142 for providing resistance during the rebound stroke of the rod 66, and for preventing fluid flow through the void 126 during the compression stroke of the rod 66. The fluid flows due to a vacuum being created by the increased volume of the interior of the pressure tube 54 from a portion of the rod 66 moving out of the interior of the pressure tube 54.

It is to be appreciated that fluid may flow in through first compression valve assembly 64, the second compression valve assembly 84b, and the piston assembly 72 in any order during the compression stroke and/or the rebound stroke of the rod 66. Depending on where the fluid flows first, i.e., which of the first compression valve assembly 64, the second compression valve assembly 84b, and the piston assembly 72 has the least amount of resistance, the shock absorber assembly 24 can be tuned by changing the resistance of first compression valve assembly 64, the second compression valve assembly 84b, and the piston assembly 72. This allows for a tunable shock absorber assembly 24.

As described above, the shock absorber assembly 24 shown in FIG. 16 is similar to the shock absorber assembly shown in FIG. 16 in structure, except the rod 66 has the striker plate 104. Likewise, the movement and function of the rod 66 in the shock absorber assembly 24 of FIG. 17 is similar to the shock absorber assembly 24 shown in FIG. 16 and described above.

The shock absorber assembly 24 shown in FIG. 18 is similar to that of FIG. 8 in that the inner tube 80 is press fit against the pressure tube 54. FIG. 18, as also shown in FIGS. 16 and 17, shows the second compression valve assembly 84b suspended within the bore 82. The shock absorber assembly 24 shown in FIG. 18 is similar to the shock absorber assembly 24 shown in FIGS. 16 and 17 except that, as described above, the shock absorber assembly 24 of FIG. 18 includes the cup 128, which has the bridge 118 integrally formed therein. However, when the shock absorber assembly 24 includes the cup 128, the shock absorber assembly 24 includes the legs 130 for supporting the cup 128. The shock assembly absorber 24 typically includes four legs 130, which allows fluid to flow around the legs 130 during the compression stroke and the rebound stroke of the rod 66. The legs 130 may define passages therein for fluid to flow, or the legs 130 may be spaced from one another to allow fluid to flow therebetween. The legs 130 are typically 90 degrees apart from one another about the inner tube 80; however, it is to be appreciated that any number of legs 130 and any spacing between the legs 130 may be used without departing from the scope of the present invention. Also, in this embodiment, the inner tube 80 has a plurality of ribs 144 defining a portion of the intermediate chamber 132 into a plurality of slots 146. The ribs 144 are press fit against the pressure tube 54. Typically, the press fit occurs at four points between the inner tube 80 and the pressure tube 54, but it is to be appreciated that the press fit may occur at any number of points without departing from the scope of the present invention. The ribs 144 allow at least a portion of the cup 128 and the pressure tube 54 to remain engaged, which can help reduce or eliminate radial movement between the cup 128 and the pressure tube 54, all while allowing fluid to flow between the cup 128 and the pressure tube 54 through the plurality of slots 146.

Fluid flow during the compression stroke and the rebound stroke of the rod 66 in FIG. 18 is similar to the shock absorber assembly 24 shown in FIGS. 16 and 17, except that the second compression valve assembly 84b is a two-way valve. The second compression valve assembly 84b is a two-way valve since fluid needs to flow through the second compression valve assembly 84b during the compression stroke and the rebound stroke of the rod 66 since the cup 128 does not define any passages. However, it is to be appreciated that the cup 128 may define passages such that fluid could flow between the lower cavity 136 and the intermediate chamber 132, which could then allow the second compression valve assembly 84b be a one-way valve, without departing from the scope of the present invention.

As mentioned above, FIGS. 19 and 20 show different embodiments of the shock absorber assembly 24 including the striker plate 104. The rod 66 in FIGS. 19 and 20 has a different configuration such that another biasing member 92 biases another valve disc 142 against the second compression valve assembly 84b to restrict fluid flow during the compression stroke of the rod 66. The valve discs 142 flex during the compression stroke and the rebound stroke of the rod 66 to appropriately allow fluid to flow through the second compression valve assembly 84b. The second compression valve assembly 84b includes a washer 120 for supporting the striker disc 116. As shown in FIGS. 19 and 20, the second compression valve assembly 84b is a two-way valve assembly. However, it is to be appreciated that the second compression valve assembly 84b shown in FIGS. 19 and 20 may be a one-way valve assembly, which would accommodate circumstances in which the cup 128 defines a plurality of passages. However, when the cup 128 is an integral piece, i.e., does not define any passages, the second compression valve assembly 84b should to be a two-way valve in order to allow fluid to flow out of and into the lower cavity 136 during the compression stroke and the rebound stroke of the rod 66.

As shown in FIG. 19, the shock absorber assembly 24 includes a member 148 disposed between the valve discs 142. The member 148 spaces the discs 110 from one another such that the valve discs 142 flex sequentially when engaged by the striker plate 104. Also, the member 148 may be comprised of an elastomeric material to provide additional dampening when the striker plate 104 contacts the discs 110. For example, the member 148 may be comprised of natural rubber or synthetic nitrile; however, it is to be appreciated that the member may be comprised of any other suitable material without departing from the scope of the present invention.

The shock absorber assembly 24 shown in FIG. 22 has a similar configuration as the shock absorber assembly 24 disclosed in FIGS. 16 through 21, with the shock absorber assembly in FIG. 22 including a plurality of caps 150 engaging the second compression valve assembly 84b, the inner tube 80, and the pressure tube 54. The plurality of caps 150 is press fit between the second compression valve assembly 84b, the inner tube 80, and the pressure tube 54. The caps 150 are typically radially spaced from one another such that fluid may flow therebetween from the lower working chamber 78 into the reservoir chamber 88. It is to be appreciated that the plurality of caps 150 may be a single, integral piece defining passages therethrough for allowing fluid to flow through the passages without departing from the scope of the present invention.

The shock absorber assembly 24 of FIG. 22 also includes legs 130 for supporting the bridge 118. The legs 130 of FIG. 22 are similar to the legs 130 described above in FIGS. 18 and 23. The legs 130 may be used in the shock absorber assembly 24 including a bridge 118, or the legs may be used in the shock absorber assembly 24 when the inner tube 80 is further defined as the cup 128. As also shown in FIG. 22, the bridge 118 includes a bridge seal 156 for engaging the inner tube 80. Typically, the legs 130, the bridge 118, and the inner tube 80 are press fit to one another. Depending on whether the bridge 118 defines voids, the second compression valve assembly 84b may be a one-way or a two-way valve. The shock absorber as shown in FIG. 22 includes a support washer 120.

The shock absorber assembly 24 shown in FIG. 22 functions similar to the shock absorber assembly 24 in FIGS. 16 through 21 during the compression stroke and the rebound stroke of the rod 66. During the compression stroke of the rod 66, fluid flows from the lower cavity 136 into the lower working chamber 78, from the lower working chamber 78 into the intermediate chamber 132, from the intermediate chamber 132 through the passages of the legs 130, or around the legs, into the first compression valve assembly 64, and from the first compression valve assembly 64 into the reservoir chamber 88. During the rebound stroke of the rod 66, fluid flows from the reservoir chamber 88 into the first compression valve assembly 64, from the first compression valve assembly 64 into the intermediate chamber 132, and from the intermediate chamber 132 into the lower working chamber 78.

As shown in FIG. 23, the inner tube 80 has an angled surface 164 defining the groove 96, which allows the retaining ring 94 to be disposed within the groove 96 and also allows fluid to better flow around the retaining ring 94 and the second compression valve assembly 84b and through the groove 96. FIG. 23 also shows a valve disc 142 and a biasing member 92 for controlling flow fluid during the compression stroke and the rebound stroke of the rod 66. The shock absorber assembly 24 also has legs 130 disposed between the cup 128 and the first compression valve assembly 64 and disposed between the cup 128 and the pressure tube 54. The shock absorber assembly 24 also includes a plurality of stack compensators 131 disposed between the legs 130 and the first compression valve assembly 64. The stack compensators 131 provide additional support and ensure a secure fit between the lower section 156, the legs 130, and the cup 128.

It is to be appreciated that various components of the shock absorber assembly 24 shown throughout the Figures are merely illustrative and do not necessarily represent the actual size or exact configuration of each component. It is also to be appreciated that the first compression valve assembly 64, the piston assembly 72, and the second compression valve assembly 84b may be a one-way valve or a two-way valve depending on the shock absorber assembly 24. For example, even if the first compression valve assembly 64, the piston assembly 72, and the second compression valve assembly 84b are described as a one-way or a two-way valve above, it is to be appreciated that first compression valve assembly 64, the piston assembly 72, and the second compression valve assembly 84b may be a one-way or a two-way valve without departing from the scope of the present invention. Examples of various embodiments of the first compression valve assembly 64, the piston assembly 72, and the second compression valve assembly 84b are disclosed in U.S. Pat. Nos. 8,590,678 or 8,714,320, both assigned to Tenneco Automotive Operating Company Inc., which are incorporated herein by reference.

It is to be appreciated that any one of the embodiments of the piston assemblies 72, first compression valve assemblies 64, second compression valve assemblies 84b, inner tubes 80, pressure tubes 54, rods 66, legs 130, and adapters 158, or any other component disclosed throughout the Figures, may be used in combination with one another without departing from the scope of the present invention. All of the embodiments shown throughout the Figures are able to use the same components due to the different configurations that allow each shock absorber assembly 24 to accommodate the same components.

It is also to be appreciated that the first diameter 60, the second diameter 90, and the third diameter 172 may vary with respect to one another depending on the first compression valve assembly 64, second compression valve assembly 84b, piston assembly 72, legs 130, bridge 118, rod 66, seals 102, ribs 144, caps 150, and adapters 158 used in each application and embodiment.

The invention has been described in an illustrative manner, and it is to be understood that the terminology which has been used is intended to be in the nature of words of description rather than of limitation. Many modifications and variations of the present invention are possible in light of the above teachings, and the invention may be practiced otherwise than as specifically described.

What is claimed is:

1. A shock absorber assembly comprising:
a pressure tube having an upper end and a lower end and having a first diameter defining an interior;
a rod guide disposed adjacent said upper end of said pressure tube;
a first compression valve assembly adjacent said lower end of said pressure tube;
a rod operatively coupled to said pressure tube having a first end supported by said rod guide for concentrically aligning said rod with said pressure tube and a second end opposite said first end with said second end disposed within said interior;
an extender coupled to said second end of said rod;
a piston assembly coupled to said extender between said rod guide and said first compression valve assembly with said piston assembly disposed within said interior and slideably coupled to said pressure tube, and with said piston assembly dividing said interior into an upper working chamber and a lower working chamber;
a second compression valve assembly coupled to said extender between said piston assembly and said first compression valve assembly;
a cup disposed within said lower working chamber of said pressure tube at said lower end with said cup having a second diameter less than said first diameter, and with said cup defining a bore shaped to receive said second compression valve assembly;
wherein said second compression valve assembly is slideably engaged with said cup when disposed within said bore;
wherein said cup and said pressure tube define an intermediate chamber therebetween with said cup having a plurality of ribs defining a portion of said intermediate chamber into a plurality of slots for allowing fluid to flow therein during a compression stroke and a rebound stroke of said rod; and
a plurality of legs disposed between said cup and said first compression valve assembly and coupled to one of said cup and said first compression valve assembly for allowing fluid to flow between said cup and said first compression valve assembly during a compression stroke and a rebound stroke of said rod.

2. The shock absorber assembly as set forth in claim 1 wherein said second compression valve assembly has an outer surface defining a notch with said second compression valve assembly including a seal disposed within said notch.

3. The shock absorber assembly as set forth in claim 2 wherein said seal is comprised of an elastomeric material.

4. The shock absorber assembly as set forth in claim 1 wherein said extender defines an indent with said second compression valve assembly disposed within said indent.

5. The shock absorber assembly as set forth in claim 4 further including a sleeve disposed between said extender and said second compression valve assembly with said sleeve and said extender defining a gap therebetween for allowing movement of said second compression valve assembly in a direction transverse to movement of said extender.

6. The shock absorber as set forth in claim 1 wherein said ribs include one or more crush ribs and wherein said cup is engaged with said pressure tube via a press fit.

7. The shock absorber assembly as set forth in claim 1 wherein said cup is engaged with said pressure tube via friction welding.

8. The shock absorber as set forth in claim 1 wherein said cup is comprised of a polymeric material.

9. The shock absorber as set forth in claim 1 wherein said cup is an integrally molded cup.

10. The shock absorber as set forth in claim 1 further comprising a reservoir tube defining a reservoir chamber at least partially accommodating said pressure tube.

11. The shock absorber assembly as set forth in claim 1 wherein said second compression valve assembly is further defined as a one-way valve assembly such that fluid flows through said second compression valve assembly during a compression stroke.

12. The shock absorber assembly as set forth in claim 1 wherein said second compression valve assembly is further defined as a two-way valve assembly such that fluid flows through said second compression valve assembly during a compression stroke and fluid flows through said second compression valve assembly during a rebound stroke.

13. A shock absorber assembly comprising:
a pressure tube having an upper end and a lower end and having a first diameter defining an interior;
a rod guide disposed adjacent said upper end of said pressure tube;
a first compression valve assembly adjacent said lower end of said pressure tube;
a rod operatively coupled to said pressure tube having a first end supported by said rod guide for concentrically aligning said rod with said pressure tube and a second end opposite said first end with said second end disposed within said interior;
a piston assembly coupled to said rod between said rod guide and said first compression valve assembly with said piston assembly disposed within said interior and slideably coupled to said pressure tube, and with said piston assembly dividing said interior into an upper working chamber and a lower working chamber;
an extender coupled to said second end of said rod and a second compression valve assembly coupled to said extender between said piston assembly and said first compression valve assembly;
a cup disposed within said lower working chamber of said pressure tube at said lower end with said cup having a second diameter less than said first diameter and with said cup defining a bore shaped to receive said second compression valve assembly;
wherein said cup and said pressure tube define an intermediate chamber therebetween with said cup having a plurality of ribs defining a portion of said intermediate chamber into a plurality of slots for allowing fluid to flow therein during a compression stroke and a rebound stroke of said rod, and
wherein said ribs include one or more crush ribs and said cup is engaged with said pressure tube via a press fit.

14. The shock absorber as set forth in claim 13 wherein said piston assembly is coupled to said rod with said extender and wherein said extender carries said piston and said secondary valve assembly.

15. A shock absorber assembly comprising:
a pressure tube having an upper end and a lower end and having a first diameter defining an interior;
a rod guide disposed adjacent said upper end of said pressure tube;
a first compression valve assembly adjacent said lower end of said pressure tube;
a rod operatively coupled to said pressure tube having a first end supported by said rod guide for concentrically aligning said rod with said pressure tube and a second end opposite said first end with said second end disposed within said interior;
an extender coupled to said second end of said rod;
a piston assembly coupled to said extender between said rod guide and said first compression valve assembly with said piston assembly disposed within said interior and slideably coupled to said pressure tube, and with said piston assembly dividing said interior into an upper working chamber and a lower working chamber;
a second compression valve assembly coupled to said extender between said piston assembly and said first compression valve assembly, and wherein said extender defines an indent with said second compression valve assembly disposed within said indent;
a cup disposed within said lower working chamber of said pressure tube at said lower end with said cup having a second diameter less than said first diameter, and with said cup defining a bore shaped to receive said second compression valve assembly;
wherein said pressure tube includes an upper section having a first diameter and a lower section having a third diameter greater than said first diameter and said cup is disposed within said lower section; and
a sleeve disposed between said extender and said second compression valve assembly with said sleeve and said extender defining a gap therebetween for allowing movement of said second compression valve assembly in a direction transverse to movement of said extender.

16. The shock absorber as set forth in claim 15 wherein an adapter is disposed between said upper section and said lower section.

* * * * *